(12) United States Patent
    Nagatani

(10) Patent No.: US 7,995,219 B2
(45) Date of Patent: Aug. 9, 2011

(54) IMAGE PROCESSING METHOD AND APPARATUS, AND PRINTER DRIVER

(75) Inventor: Masahiro Nagatani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1503 days.

(21) Appl. No.: 10/385,425

(22) Filed: Mar. 12, 2003

(65) Prior Publication Data

US 2003/0174346 A1    Sep. 18, 2003

(30) Foreign Application Priority Data

Mar. 15, 2002    (JP) ................. 2002-072555

(51) Int. Cl.
*G06K 15/02* (2006.01)
*H04N 1/387* (2006.01)
*H04N 1/393* (2006.01)
*G06T 3/40* (2006.01)
*G06T 3/60* (2006.01)

(52) U.S. Cl. ........... 358/1.1; 358/1.2; 358/1.9; 358/1.18

(58) Field of Classification Search .......... 355/243, 355/311; 382/298, 297, 100, 277, 282, 112; 358/487, 1.2, 1.18, 1.9, 1.5, 75, 451, 1.15, 358/1.1, 449, 296; 705/27; 340/724; 395/102, 395/101, 109; 347/101, 5, 16; 348/241
See application file for complete search history.

(56) References Cited

U.S. PATENT DOCUMENTS

| 4,200,392 A * | 4/1980 | Svatek .......................... 355/45 |
|---|---|---|
| 4,591,904 A * | 5/1986 | Urabe et al. ................. 358/537 |
| 4,602,251 A * | 7/1986 | Sawada et al. .............. 345/590 |
| 4,799,080 A * | 1/1989 | Fujiwara ..................... 399/185 |
| 4,928,252 A * | 5/1990 | Gabbe et al. ................. 358/1.2 |
| 5,311,259 A * | 5/1994 | Moriya et al. ............... 399/86 |
| 5,402,187 A * | 3/1995 | Ezaki ........................... 348/474 |
| 5,546,474 A * | 8/1996 | Zuniga ......................... 382/176 |
| 5,745,659 A * | 4/1998 | Rigau Rigau et al. ....... 358/1.2 |
| 5,796,877 A * | 8/1998 | Gusmano ..................... 382/298 |
| 5,956,466 A * | 9/1999 | Horiuchi et al. ............. 358/1.9 |
| 6,018,397 A * | 1/2000 | Cloutier et al. .............. 358/1.1 |
| 6,109,745 A * | 8/2000 | Wen ............................. 347/101 |

(Continued)

FOREIGN PATENT DOCUMENTS

JP    10-133288    5/1998

(Continued)

*Primary Examiner* — King Y. Poon
*Assistant Examiner* — Allen H Nguyen
(74) *Attorney, Agent, or Firm* — Fitzpatrick, Cella, Harper & Scinto

(57) ABSTRACT

The invention provides an image processing method for performing output processing such that a simple operation by the user causes an output area to be filled, an apparatus and a printer driver for carrying out the method. When a desired image is to be outputted to an image output area of an image output medium without leaving a margin, the desired image is scaled with the longitudinal and lateral scaling factors being the same so that no margin is left on the image output area, and an image output position is shifted so that the center of the scaled image corresponds with the center of the image output area. Also, when the image scaled and shifted in the output position extends off the image output area, the output of the portion extending off the image output area is prohibited. In addition, the image is rotated to an angle of 90° so that the area of portion of the scaled image extending off the image output area is reduced.

6 Claims, 22 Drawing Sheets

U.S. PATENT DOCUMENTS

| | | | | |
|---|---|---|---|---|
| 6,160,633 A * | 12/2000 | Mori | | 358/1.5 |
| 6,175,653 B1 * | 1/2001 | de Queiroz | | 382/233 |
| 6,250,734 B1 * | 6/2001 | Otsuki | | 347/16 |
| 6,278,528 B1 * | 8/2001 | Ohtsuka et al. | | 358/1.15 |
| 6,282,300 B1 * | 8/2001 | Bloom et al. | | 382/100 |
| 6,297,846 B1 * | 10/2001 | Edanami | | 348/239 |
| 6,456,732 B1 * | 9/2002 | Kimbell et al. | | 382/112 |
| 6,456,745 B1 * | 9/2002 | Bruton et al. | | 382/298 |
| 6,559,971 B1 * | 5/2003 | Watts et al. | | 358/1.2 |
| 6,614,564 B1 * | 9/2003 | Sakaguchi | | 358/487 |
| 6,912,311 B2 * | 6/2005 | Anderson et al. | | 382/209 |
| 7,016,869 B1 * | 3/2006 | Haeberli | | 705/27 |
| 7,064,858 B2 * | 6/2006 | Iwai et al. | | 358/1.2 |
| 7,072,069 B2 * | 7/2006 | Kim | | 358/1.18 |
| 2002/0051205 A1 * | 5/2002 | Teranishi et al. | | 358/1.18 |
| 2003/0095197 A1 * | 5/2003 | Wheeler et al. | | 348/241 |
| 2003/0133162 A1 * | 7/2003 | Lupien et al. | | 358/3.26 |
| 2003/0146997 A1 * | 8/2003 | Fredlund et al. | | 348/333.02 |
| 2003/0206316 A1 * | 11/2003 | Anderson et al. | | 358/1.18 |

FOREIGN PATENT DOCUMENTS

| | | |
|---|---|---|
| JP | 11-327850 | 11/1999 |
| JP | 2001-127996 | 5/2001 |
| JP | 2001-347720 | 12/2001 |

* cited by examiner

IMAGE PROCESSING METHOD AND APPARATUS, AND PRINTER DRIVER

FIELD OF THE INVENTION

The present invention relates to an image processing method and an apparatus and a printer driver for carrying out the method and, more particularly, to an image processing method when it is desirable to print the central portion of an image using the entire print area of a print medium and without cutting off the image wherever possible, and a apparatus and a printer driver for carrying out the method.

BACKGROUND OF THE INVENTION

Hitherto, a fit-page print function has been available such that when an image synthesized on a personal computer is outputted by a printer, for example, the image is placed on a print area by a printer driver or the like. Also, a centering function for positioning the image in the center of a print medium has been available.

However, there has arisen a request for printing an image on the entire print area, and particularly printers having a borderless print function have become the mainstream among those available in current years, and thus a technique for printing the image on the print medium without leaving a margin is desired. For achieving the technique with the function of a conventional printer driver, a method is first conceivable in which the user cut off image data itself in an aspect ratio same as that of the print medium, and fits the image data in a borderless print area to print the image. Second, a method is also conceivable in which the user uses a scaling function to scale up the image so that the image significantly extends off the print medium, and prints the image. Third, a method is also conceivable in which the image is scaled up with an application in liaison with the printer driver so that the image can be printed on the print medium without leaving a margin.

For the first and second methods that are an extension of the conventional technique, however, expert knowledge is required and a large amount of time is consumed for processing because the manual work by the user makes up a large proportion. Also, the third method has a disadvantage that the image cannot be easily printed in an environment where a dedicated application is not available.

SUMMARY OF THE INVENTION

In view of the above described problems associated with conventional techniques, the present invention provides an image processing method for performing output processing such that a simple operation by the user causes an output area to be filled without leaving a margin, an apparatus and a printer driver for carrying out the method.

For solving the above problems, the image processing method comprises the steps of: scaling a print image so that the print image is larger than a print area larger than a print medium; and centering the scaled print image so that the center of the scaled print image corresponds with the center of the print area.

Also, the method comprises the steps of: scaling a print image so that the print image is larger than a print area larger than a print medium when borderless print is specified; and avoiding centering the scaled print image so that the center of the scaled print image corresponds with the center of the print area when centering is not specified, and centering the scaled print image so that the center of the scaled print image corresponds with the center of the print area when centering is specified.

Also, the method is an image processing method for outputting a desired image to an image output area of an image output medium without leaving a margin, comprising: an image scaling step of scaling the above described desired image with the longitudinal and lateral scaling factors being the same so that no margin is left on the above described image output area; and an output position shifting step of shifting an image output position so that the center of the image scaled in the image scaling step corresponds with the center of the above described image output area.

Here, the method further comprises an output prohibiting step of prohibiting the output of the portion extending off the above described image output area when the above described image scaled and shifted in the output position extends off the above described image output area. In addition, in the above described image scaling step, the image is scaled so that the image matches with the above described image output area in at least any one of longitudinal and lateral directions. In addition, in the above described image scaling step, the scaling factor is determined based on comparison between the aspect ratio of the image output area and the aspect ratio of a desired image, and in the case where the image is scaled up, the image is scaled so that the image longitudinally matches with the above described image output area when the aspect ratio of the above described image output area is larger, and the image is scaled so that the image laterally matches with the above described image output area when the aspect ratio of the above described image output area is smaller. In addition, the method further comprises an image rotating step of rotating an image to an angle of 90° so that the area in which the scaled image extends off the above described image output area is reduced prior to the above described image scaling step. In addition, in the above described image rotating step, whether the image is to be rotated or not is determined based on the aspect ratio of the image output area and the aspect ratio of a desired image, and the image is not rotated when the above described aspect ratios are both larger or smaller than 1, and the image is rotated when one of the above described aspect ratios is larger than 1 and the other is smaller than 1. In addition, the above described image output area is the entire area of the above described image output medium. In addition, the above described image output medium is a print medium, the above described image output area is a print area, and all of the above described steps are carried out by the printer driver.

Also, the image processing apparatus of the present invention comprises: means for scaling a print image so that the print image is larger than a print area larger than a print medium; and means for centering the scaled print image so that the center of the scaled print image corresponds with the center of the print area.

Also, the apparatus comprises: means for scaling a print image so that the print image is larger than a print area larger than a print medium when borderless print is specified; and means for avoiding centering the scaled print image so that the center of the scaled print image corresponds with the center of the print area when centering is not specified, and centering the scaled print image so that the center of the scaled print image corresponds with the center of the print area when centering is specified.

Also, the image processing apparatus of the present invention is an image processing apparatus for generating image data outputted to an image output medium by an image output apparatus, comprising: image scaling means for generating image data obtained by scaling a desired image with the longitudinal and lateral scaling factors being the same so that the above described image output apparatus outputs image data to an image output area of the above described image output medium without leaving a margin; and output position shifting means for generating image data of which image output position is shifted so that the center of the image scaled by the image scaling means is outputted to the center of the above described image output area.

Here, the apparatus further comprises output prohibiting means for prohibiting the output of the portion extending off the above described image output area so that the above described image scaled and shifted in the output position does not extend off the above described image output area. In addition, the above described image scaling means scales the image so that the image matches with the above described image output area in at least any one of longitudinal and lateral directions. In addition, the above described image scaling means determines the scaling factor based on comparison between the aspect ratio of the image output area and the aspect ratio of a desired image, and in the case where the image is scaled up, the image is scaled so that the image longitudinally matches with the above described image output area when the aspect ratio of the above described image output area is larger, and the image is scaled so that the image laterally matches with the above described image output area when the aspect ratio of the above described image output area is smaller. In addition, the apparatus further comprises image rotating means for generating image data with an image rotated to an angle of 90° so that the area in which the scaled image extends off the above described image output area is reduced. In addition, the above described image rotating means determines whether the image is to be rotated or not based on the aspect ratio of the image output area and the aspect ratio of a desired image, and the image is not rotated when the above described aspect ratios are both larger or smaller than 1, and the image is rotated when one of the above described aspect ratios is larger than 1 and the other is smaller than 1. In addition, the above described image output area is the entire area of the above described image output medium. In addition, the above described image output medium is a print medium, the above described image output area is a print area, and the above described means is all included in the printer driver.

Also, the printer driver of the present invention comprises: means for scaling a print image so that the print image is larger than a print area larger than a print medium; and means for centering the scaled print image so that the center of the scaled print image corresponds with the center of the print area.

Also, the printer driver comprises: means for scaling a print image so that the print image is larger than a print area larger than a print medium when borderless print is specified; and means for avoiding centering the scaled print image so that the center of the scaled print image corresponds with the center of the print area when centering is not specified, and centering the scaled print image so that the center of the scaled print image corresponds with the center of the print area when centering is specified.

Also, the printer driver of the present invention is a printer driver for generating image data outputted to an image output medium by an image output apparatus, comprising: an image scaling module for generating image data obtained by scaling a desired image with the longitudinal and lateral scaling factors being the same so that the above described image output apparatus outputs image data to an image output area of the above described image output medium without leaving a margin; and an output position shifting module for generating image data of which image output position is shifted so that the center of the image scaled by the image scaling module is outputted to the center of the above described image output area.

Here, the printer driver further comprises an output prohibiting module for prohibiting the output of the portion extending off the above described image output area so that the above described image scaled and shifted in the output position does not extend off the above described image output area. In addition, the above described image scaling module scales the image so that the image matches with the above described image output area in at least any one of longitudinal and lateral directions. In addition, the above described image scaling module determines the scaling factor based on comparison between the aspect ratio of the image output area and the aspect ratio of a desired image, and in the case where the image is scaled up, the image is scaled so that the image longitudinally matches with the above described image output area when the aspect ratio of the above described image output area is larger, and the image is scaled so that the image laterally matches with the above described image output area when the aspect ratio of the above described image output area is smaller. In addition, the printer driver further comprises an image rotating module for generating image data with an image rotated to an angle of 90° so that the area in which the scaled image extends off the above described image output area is reduced. In addition, the above described image rotating module determines whether the image is to be rotated or not based on the aspect ratio of the image output area and the aspect ratio of a desired image, and the image is not rotated when the above described aspect ratios are both larger or smaller than 1, and the image is rotated when one of the above described aspect ratios is larger than 1 and the other is smaller than 1. In addition, the above described image output area is the entire area of the above described image output medium. In addition, the above described image output medium is a print medium, and the above described image output area is a print area.

The present invention also provides a storage medium for storing the printer driver in a computer-readable manner.

The features and advantages of the present invention will be apparent from the preferred embodiments described below with reference to the attached drawings.

DETAILED DESCRIPTION OF THE PREFERRED EMBODIMENTS

The embodiments of the present invention will be described below with reference to the attached drawings.

Example of Configuration of Image Processing System of Embodiment

Figure 1:
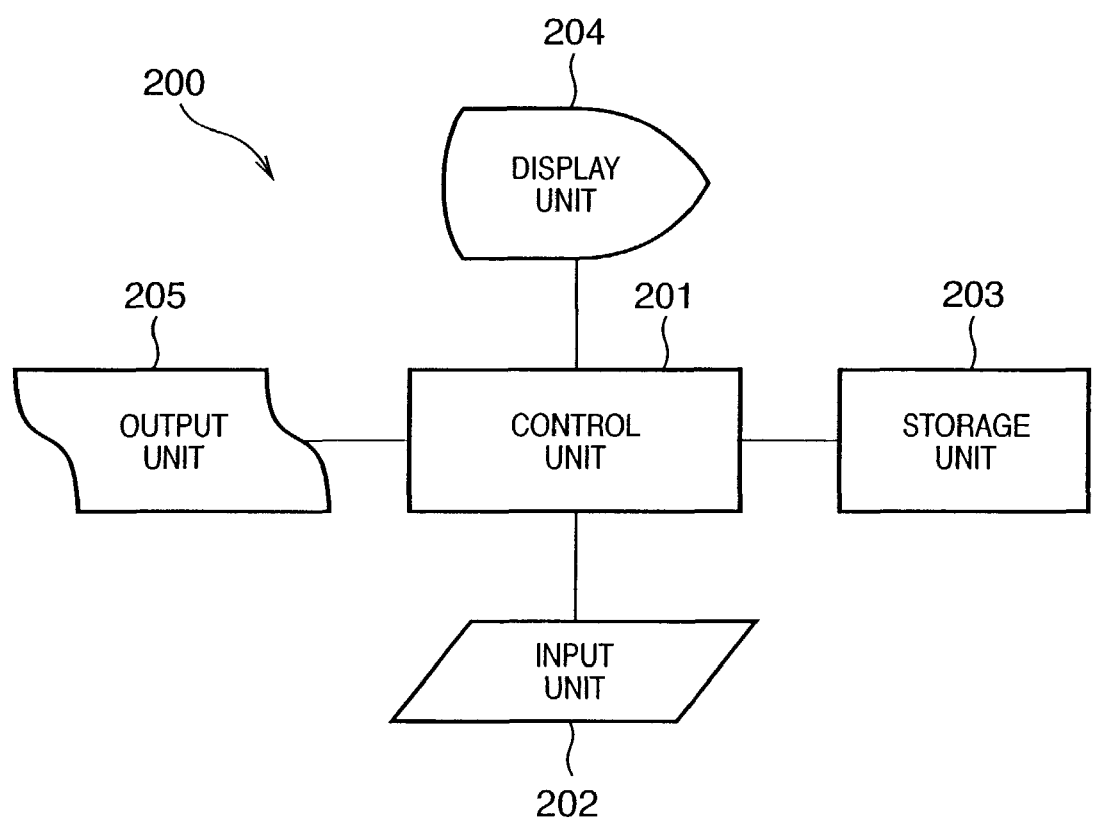
FIG. 1 is a block diagram of an example of configuration of an image processing system of the embodiment of the present invention.

FIG. 1 is a block diagram showing a configuration of an image processing system illustrating one embodiment of the present invention. In FIG. 1, a local image processing system 200 is shown.

An output unit 205 may take a form of, for example, a color printer, and performs color print output over a print paper using inks of four colors of yellow (Y), magenta (M), cyan (C) and black (K). Print data consisting of density data of Y, M, C and K for use in this output unit 205 is obtained by image processing carried out by a control unit 201 in accordance with a program stored in a storage unit 203, and the image processing includes, for example, color correction, color transformation, gray level correction and quantization processing preferably carried out by hardware in terms of processing speed and load.

The control unit 201 has a CPU, and performs data processing associated with this system such as color transformation described later and initial processing for the color transformation, and control of operations of mechanical elements of respective parts. The storage unit 203 consists of memories such as a ROM and a RAM, a hard disk and external storage units such as a floppy disk in their entirety, and stores data and programs for use in this embodiment described later.

For example, images read by a scanner (not shown) and images sent through communication means are stored in the storage unit 203, and an operator of this unit may subject an image displayed on a display unit 204 such as a CRT to desired processing by operational input from an input unit 202 constituted by a keyboard, a mouse and the like to generate an image to be print-outputted by an output unit 205.

In this way, the image generated and outputted by this unit is generally gray level data of luminance signals R, G and B, and color correction, color transformation, gray level correction and quantization processing are carried out for processing the gray level data into print data of the output unit 205.

Furthermore, application of the present invention is not limited to the above described units as a matter of course. For example, it is well known that color transformation processing or the like is carried out in units such as a copier, and the present invention is apparently applicable to such units or systems.

Figure 2:
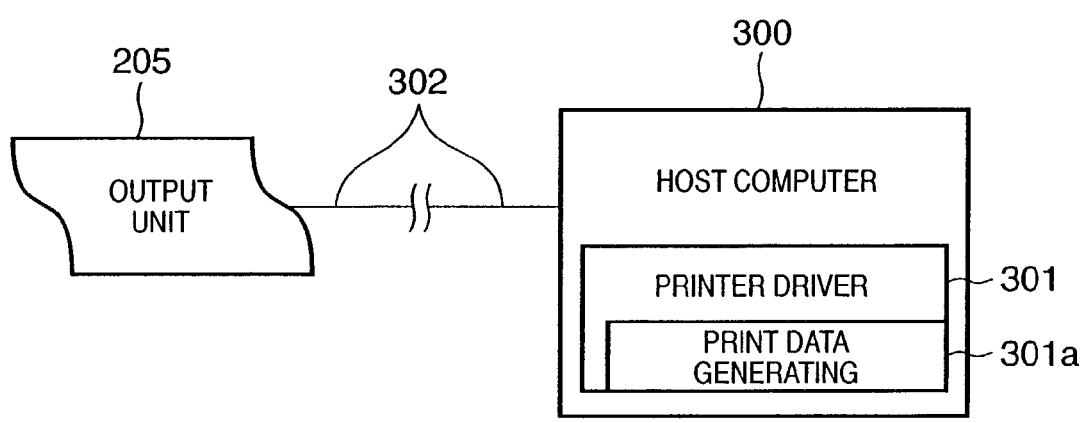
FIG. 2 is a block diagram of another example of configuration of the image processing system of the embodiment of the present invention.

FIG. 2 shows one example of an image processing system remote-connected through communication means such as LAN or internet, which is different from the local image processing system 200 shown in FIG. 1.

The system is constituted by the output unit 205 and a host computer 300 instructing the output unit 205 to perform printing through communication means 302. Furthermore, a configuration in which a controller is independently inserted between the host computer 300 and the output unit 205 is also conceivable. A printer driver 301 for controlling the output of the output unit 205 is stored in the host computer 300, and a print data generating unit 301a of this embodiment is incorporated in the printer driver 301, thus making it possible to achieve image output over an entire print area or print medium according to this embodiment without necessity of complicated operations by the user as described in detail below.

Figure 3:
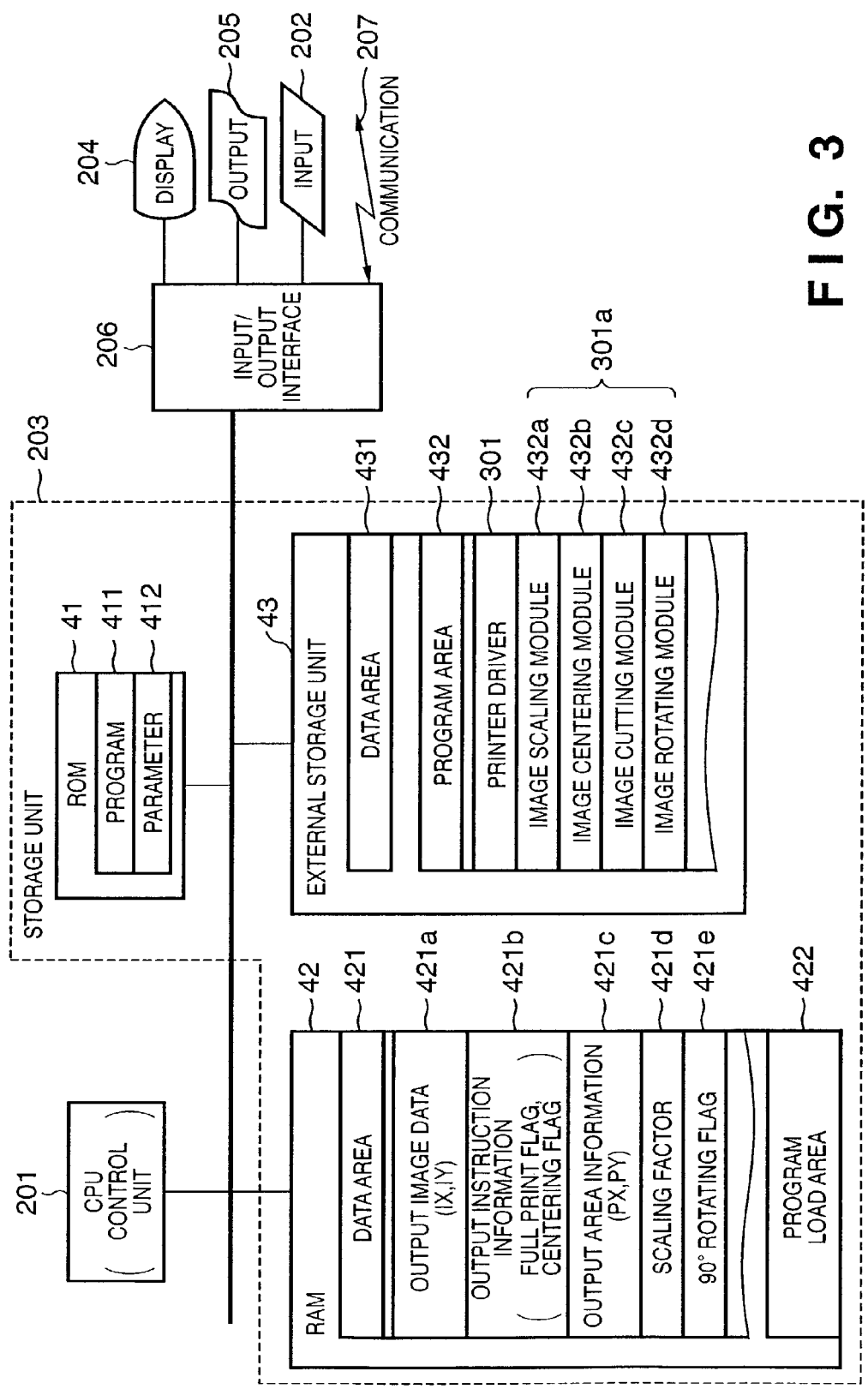
FIG. 3 is a block diagram of an example of configuration of a control unit of the image processing system of the embodiment of the present invention.

FIG. 3 is a block diagram showing an example of hardware configuration of this embodiment. Here, an example of configuration of the storage unit 203 is shown particularly in detail.

Reference numeral 201 denotes a CPU equivalent to the control unit of FIG. 1, and a ROM 41, a RAM 42 and an external storage unit 43 such as a disk and CD are equivalent to the storage unit 203 of FIG. 1. Reference numeral 206 denotes an input/output interface newly connecting communication means 207 to the display unit 204, the output unit 205 and the input unit 202 similar to those of FIG. 1. Here, the units of FIG. 1 and the host of FIG. 2 are similar in configurations of the control unit 201 and the storage unit 203.

A program 411 and a parameter 412 which do not need to be changed are stored in the ROM 41.

The RAM 42 is a storage area storing the program and data on a temporary basis, and consists of a data area 421 and a program load area 422. System programs such as an OS and a printer driver from the external storage unit 43 or application programs provided from the user and the like are loaded in the program load area 422, in which the programs are executed by the CPU 201.

The data area 421 has as areas to be used in this embodiment, for example, an area 421a for storing output image data (also storing widths IX and IY along the directions of XY axes of the output image described later), an area 421b for storing information of output instructions provided by the user or an application (also storing a full print flag and centering flag described later. Furthermore, one area filling flag may be provided instead of individually providing the above described flags), an area 421c for storing output area information (also storing widths PX and PY along the directions of XY axes of the print area described later. These widths PX and PY may be fixed in correspondence with the output unit connected in advance, but are preferably acquired by making an inquiry to the output unit), an area 421d for storing scaling factors (the scaling factor here refers to the scaleup of images in the description of this embodiment, but there are cases where an image larger than the print area is scaled down, and those skilled in the art can easily understand algorisms of scaling down from algorisms of scaling up, and the present invention includes such cases), and an area 421e for storing the rotation of images to an angle of 90°. Furthermore, an area for storing image data undergoing the processing in this embodiment and image data already subjected to the processing is also included in the data area 421. Alternatively, if received output image data 421a does not need to be retained, the area may be shared for that purpose.

The external storage unit 43 includes fixed hard disks and memory cards, or optical disks such as floppy disks and CDs, magnetic and optical cards, IC cards and memory cards that are detachable and portable, and consists of a data area 431 and a program area 432.

A program to be loaded in the program load area 422 of the RAM 42 and executed (may be executed directly in the memory card or the like) is stored in the program area 432. FIG. 3 shows the printer driver 301 for use in this embodiment, which also stores system programs such as an OS and a BIOS and application programs. FIG. 3 further shows modules constituting a print data generating unit 301a associated with this embodiment, which constituted a part of the printer driver 301. The image scaling module 432a is a module for scaling (scaling up in this embodiment) the image so that the print area (print medium) is filled with the image when the full print flag is ON, an image centering module 432b is a module for shifting the image to the center of the print area (print medium) when the centering flag is ON, an image cutting module 432c is a module for cutting off the portion of the image extending off the print area (print medium) when the image to be printed is larger than (extending off) the print area (print medium), and an image rotating module 432d is a module for rotating the image if necessary so that the area of portion of the image to be cut off is minimized.

Example of Operation of Image Processing System of Embodiment

An example of operation of the image processing unit having the above described configuration will be described below with reference to flowcharts shown in FIGS. 4 to 6, and diagrams shown in FIGS. 7 to 22, which illustrate the relation between the print area (print medium) and image data. Furthermore, an example in which the image is scaled up will be described below, but the present invention includes processing in which the image is scaled down as described above.

Example of Partial Procedure of Printer Driver

Figure 4:
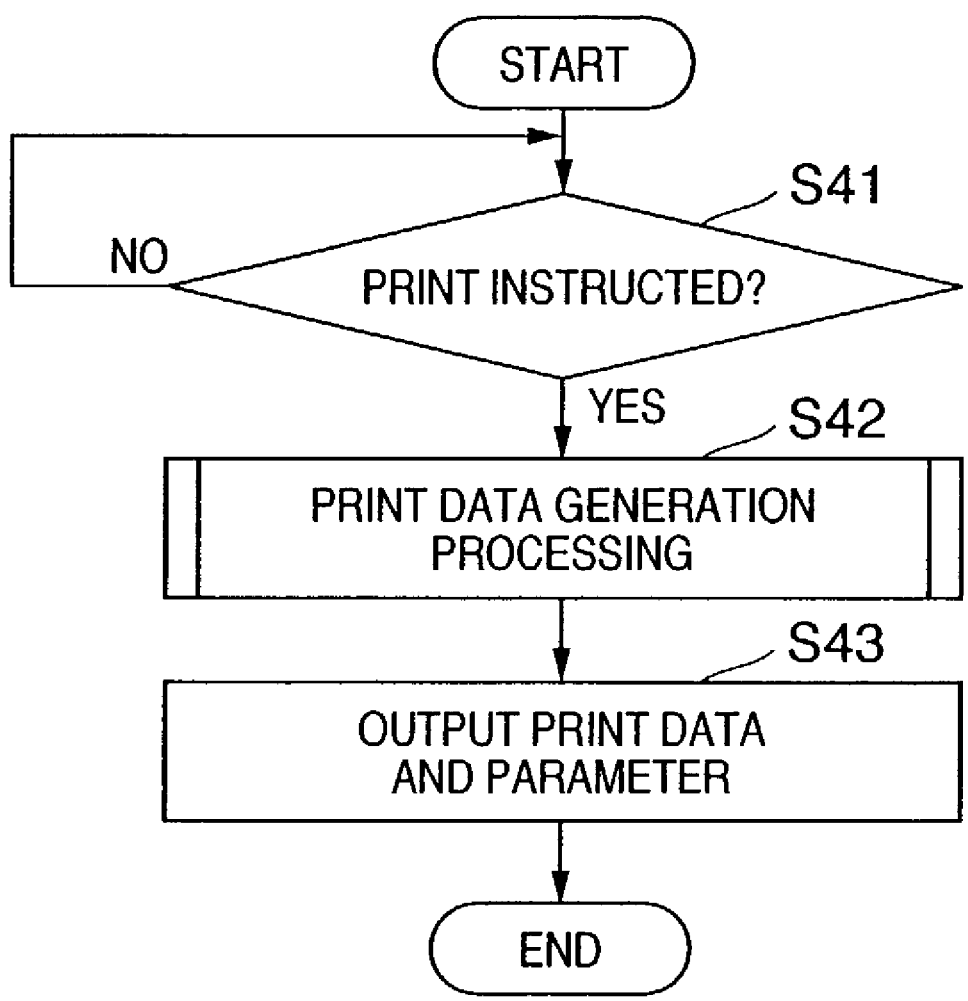
FIG. 4 is a flowchart showing an example of partial procedure of a printer driver of the embodiment of the present invention.

FIG. 4 is a flowchart showing a part of procedure of the printer driver 301 according to this embodiment.

First, a print instruction from the user or application is waited at step S41. The print instruction from the user or application is provided by soft buttons each corresponding to selection of image data, selection of a print size and the like as well as setting of the full print flag and centering flag and one soft button for creation of print data, or transference of parameters from the application. Image data is stored in the storage area 421a for output data, and the parameter is stored in the storage area 421b for output instruction information.

Then, print data creation processing is carried out at step S42. For the print data creation processing, its procedure will be described further in detail later with reference to FIG. 5. Image data subjected to the print data creation processing at step S42 is sent to a printing unit at step S43.

Example of Procedure Print Data Creation Processing S42

Figure 5:
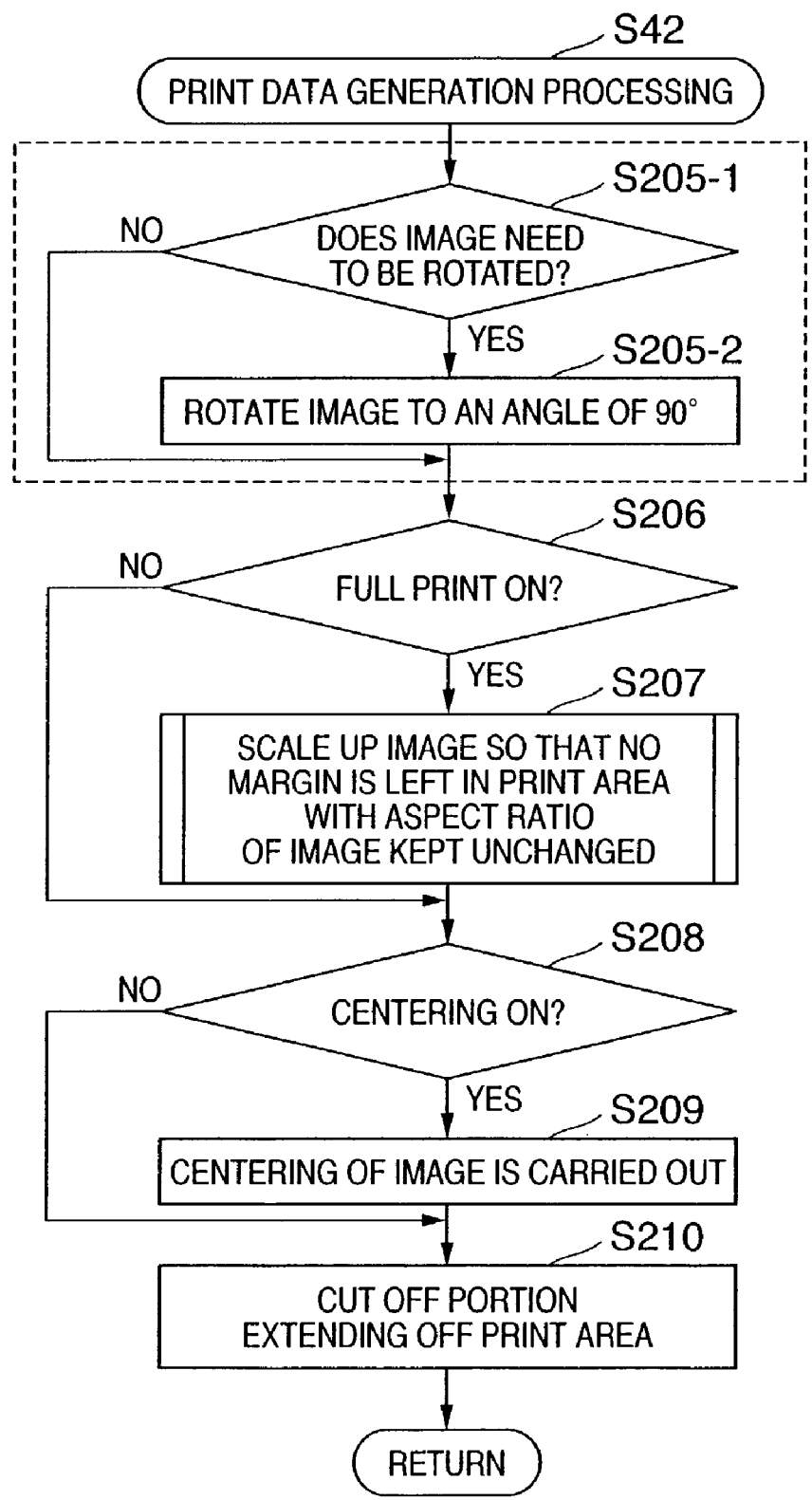
FIG. 5 is a flowchart showing an example of procedure of print data generation processing S42 of FIG. 4.

FIG. 5 is a flowchart showing an example of procedure of the print data creation processing (S42) of FIG. 4 including a full print function and a centering function. If the print area is identical to the print medium in FIG. 5, the image is apparently printed on the entire print medium (borderless print). That is, basically, borderless print and normal bordered print are different only in the print area. In borderless print, the image is generated and printed on the medium in such a manner that the image extends off the medium, thereby generating margin-free data. In this example, step S205 is skipped.

Figure 7:
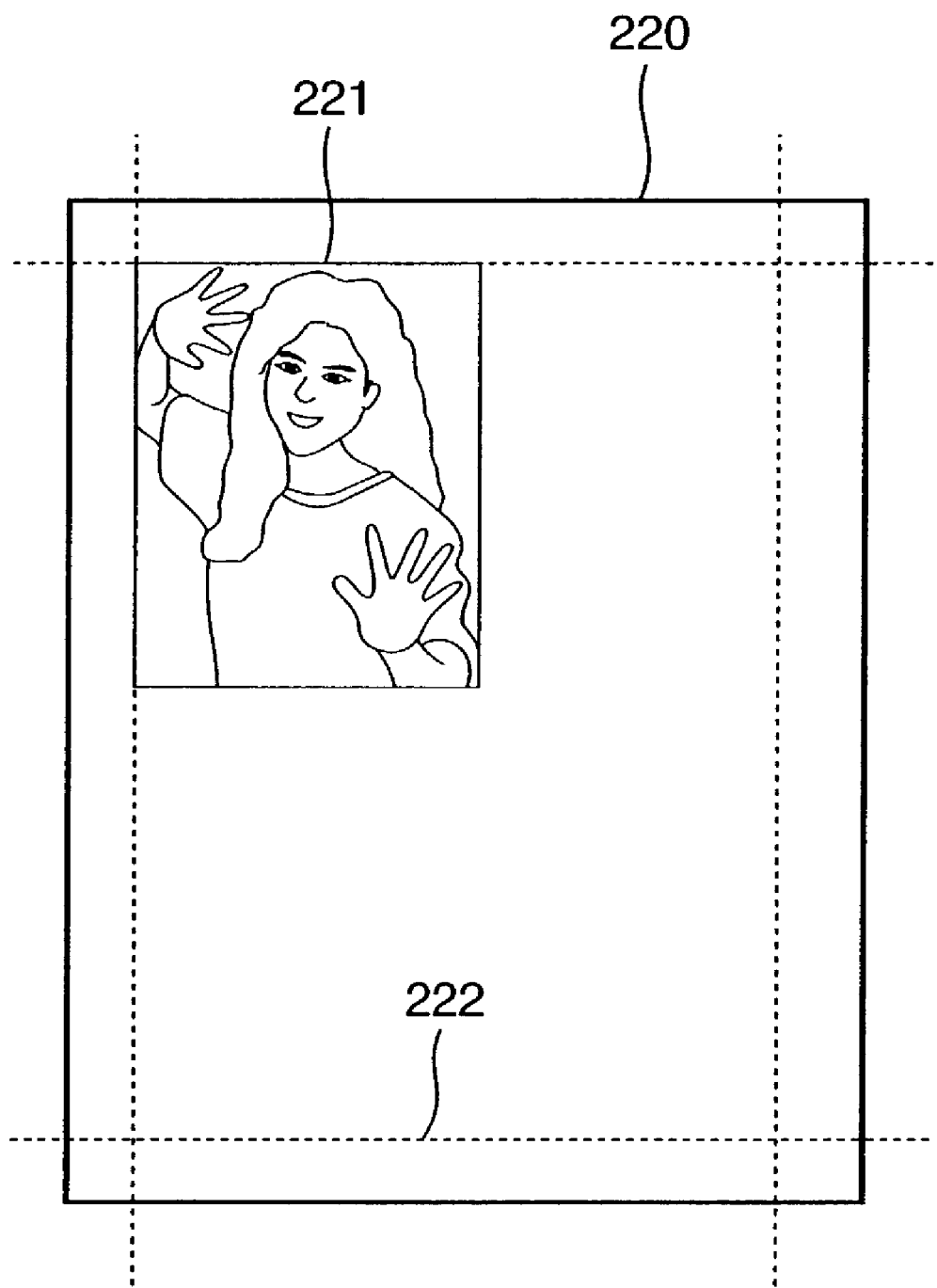
FIG. 7 shows one example of image layout before performing a full print function and a centering function according to the embodiment of the present invention.
Figure 8:
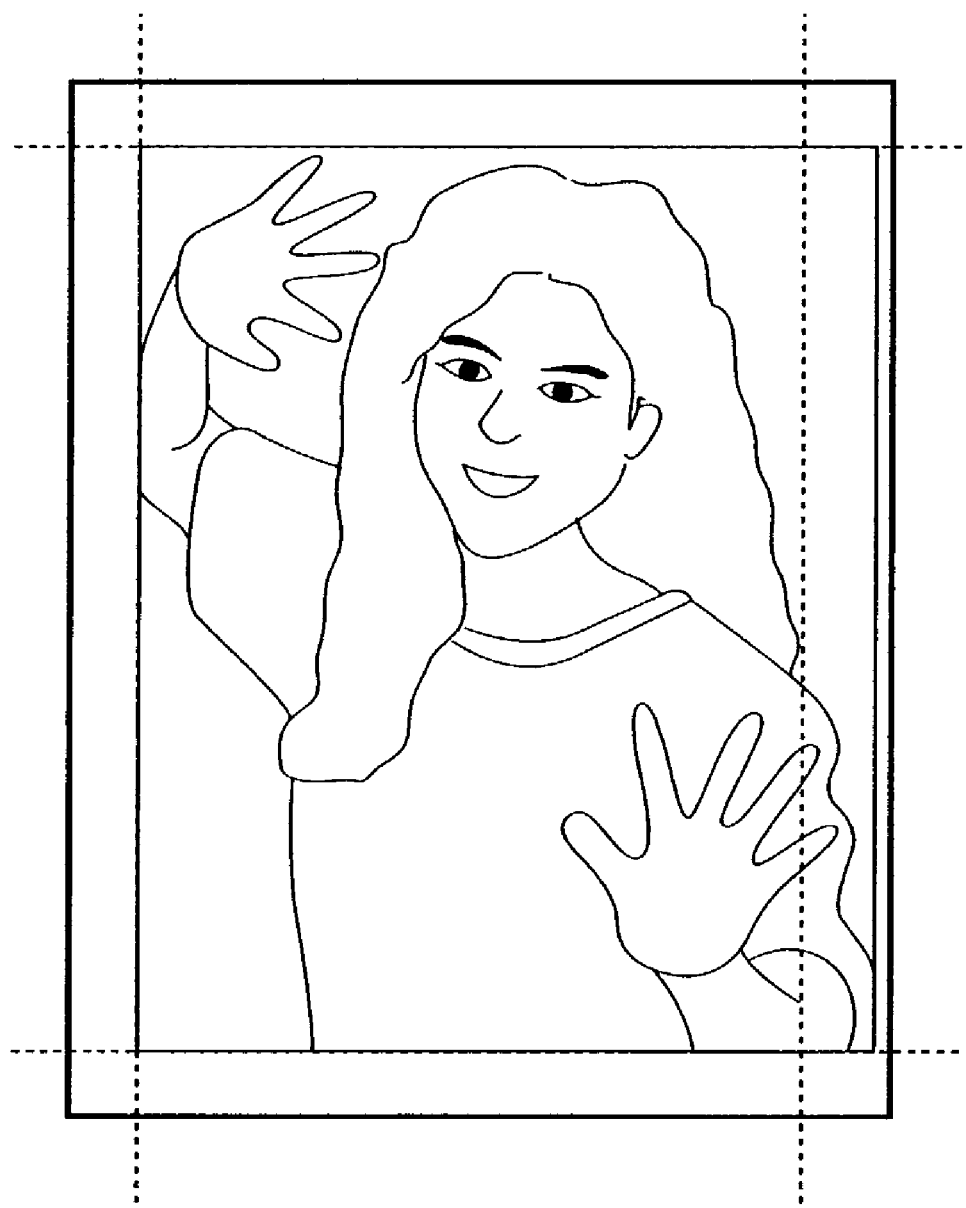
FIG. 8 shows one example of an image obtained by performing on the image of FIG. 7 the full print function according to the embodiment of the present invention.
Figure 9:
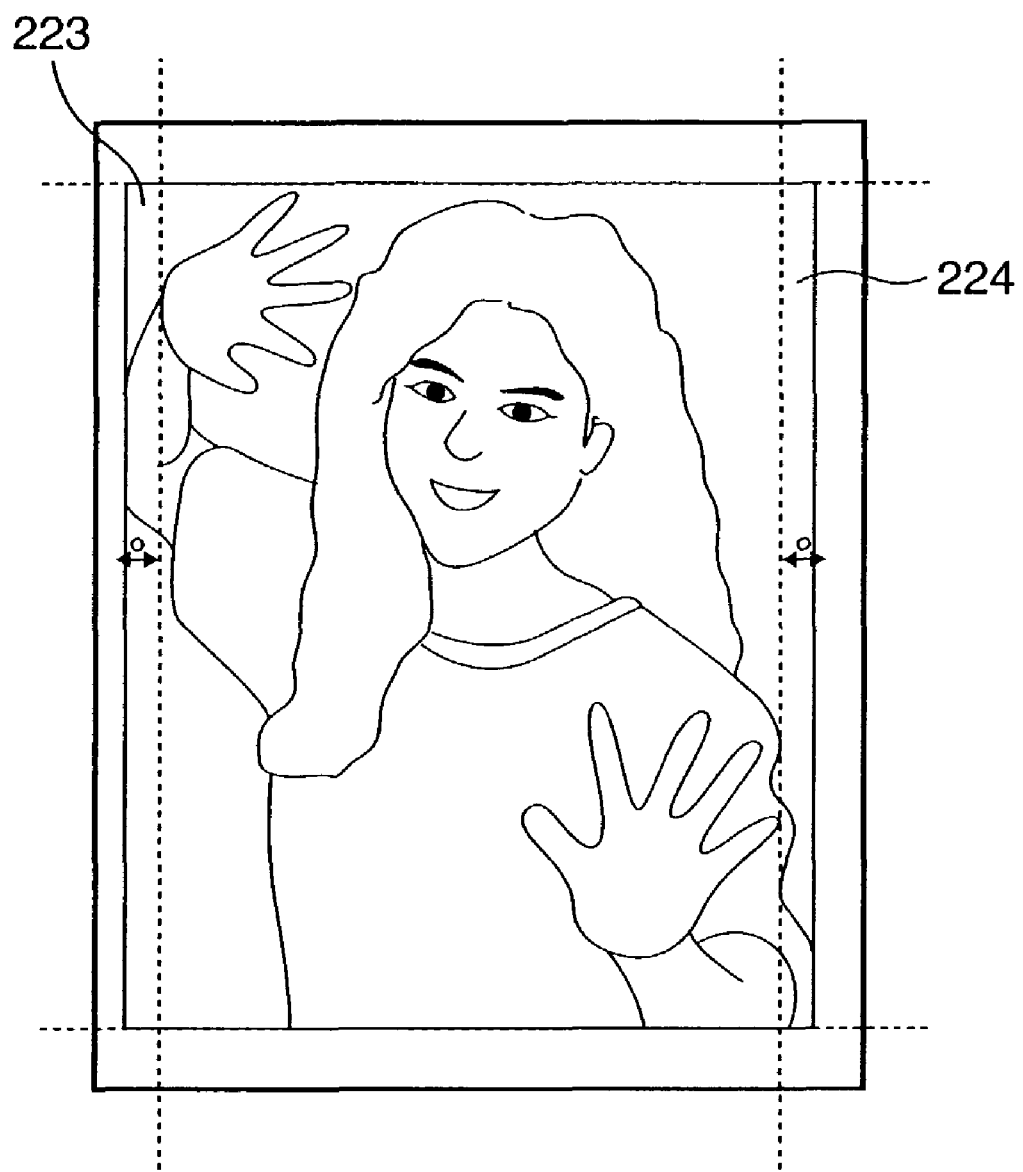
FIG. 9 shows an example of an image obtained by performing on the image of FIG. 8 the centering function according to the embodiment of the present invention.
Figure 10:
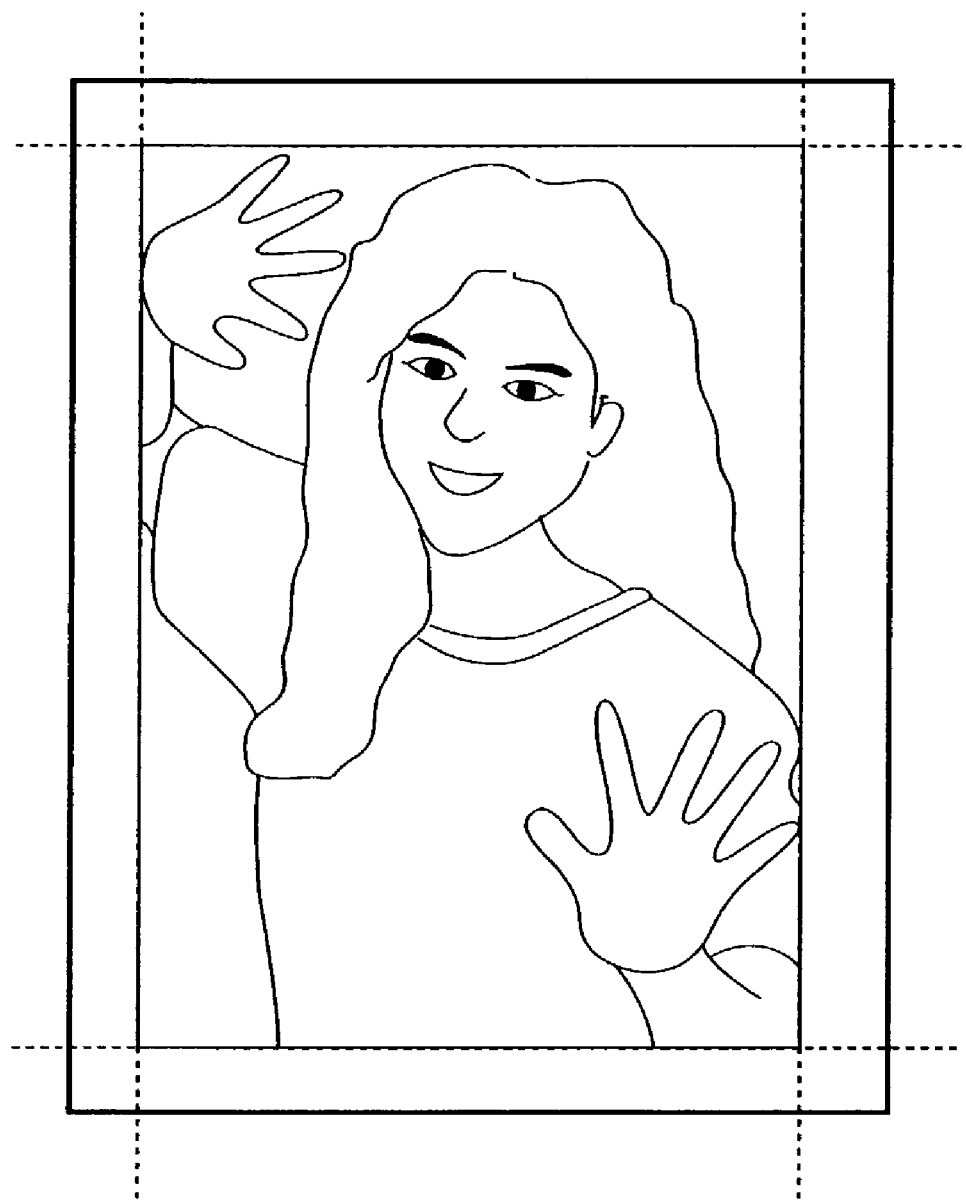
FIG. 10 shows an example of an image obtained by cutting off the portion of the image of FIG. 10 extending off a print area according to the embodiment of the present invention.

First, the relation between the print medium (medium 220 of FIG. 7) and the image (denoted by reference numeral 221 in FIG. 7) and the print area (denoted by reference numeral 222 in FIG. 7) of this example is shown in FIG. 7. Whether the full print function is ON (the full print flag is turned to ON) or not is determined at step S206 in FIG. 5. If it is ON, the image is scaled up so that no margin is left on the image area with an image aspect ratio being kept unchanged at step S207 (see FIG. 8). The image data scaled up is stored in the RAM 42 on a temporary basis. Furthermore, needless to say, scaleup processing includes interpolation processing. If the full print function is OFF, scaleup processing is not carried out. Here, a scaleup factor allowing the image to extend over the entire print area in longitudinal length is acceptable, but a scaleup factor such that the image extends over the entire print area in lateral length may be achieved depending on the image and print area. Case classification for this will be described in detail later.

Then, whether centering is ON (the centering flag is turned to ON) or not is determined at step S208. If the centering is ON, the centering of the image is carried out at step S209 (see FIG. 9). If the centering is OFF, the centering of the image is not carried out. Furthermore, the centering processing is processing in which the image is shifted so that the areas of portion of the image extending off the print area are equivalent on both sides in the direction in which the image extends off the print area, and detailed description thereof is not presented here. The image data subjected to centering is stored in the RAM 42 on a temporary basis.

At step S210, portions extending off the print area (denoted by reference numerals 223 and 224 in FIG. 9) are deleted to generate print data (see FIG. 10) and the print data is stored in the RAM 42 on a temporary basis.

Thus, the user turns both the full print function and centering function to ON (or turns print data creation to ON), whereby data in the center of the image can easily be printed on the print area (print medium) without leaving a margin.

Example of Procedure of Image Scaleup Processing S207

When the image is scaled up so that a margin is not left by the image and the print area, case classification for scaleup process is needed, and will be described.

First, the principal of processing of this example will be described with reference to FIGS. 17 to 22.

Figure 17:
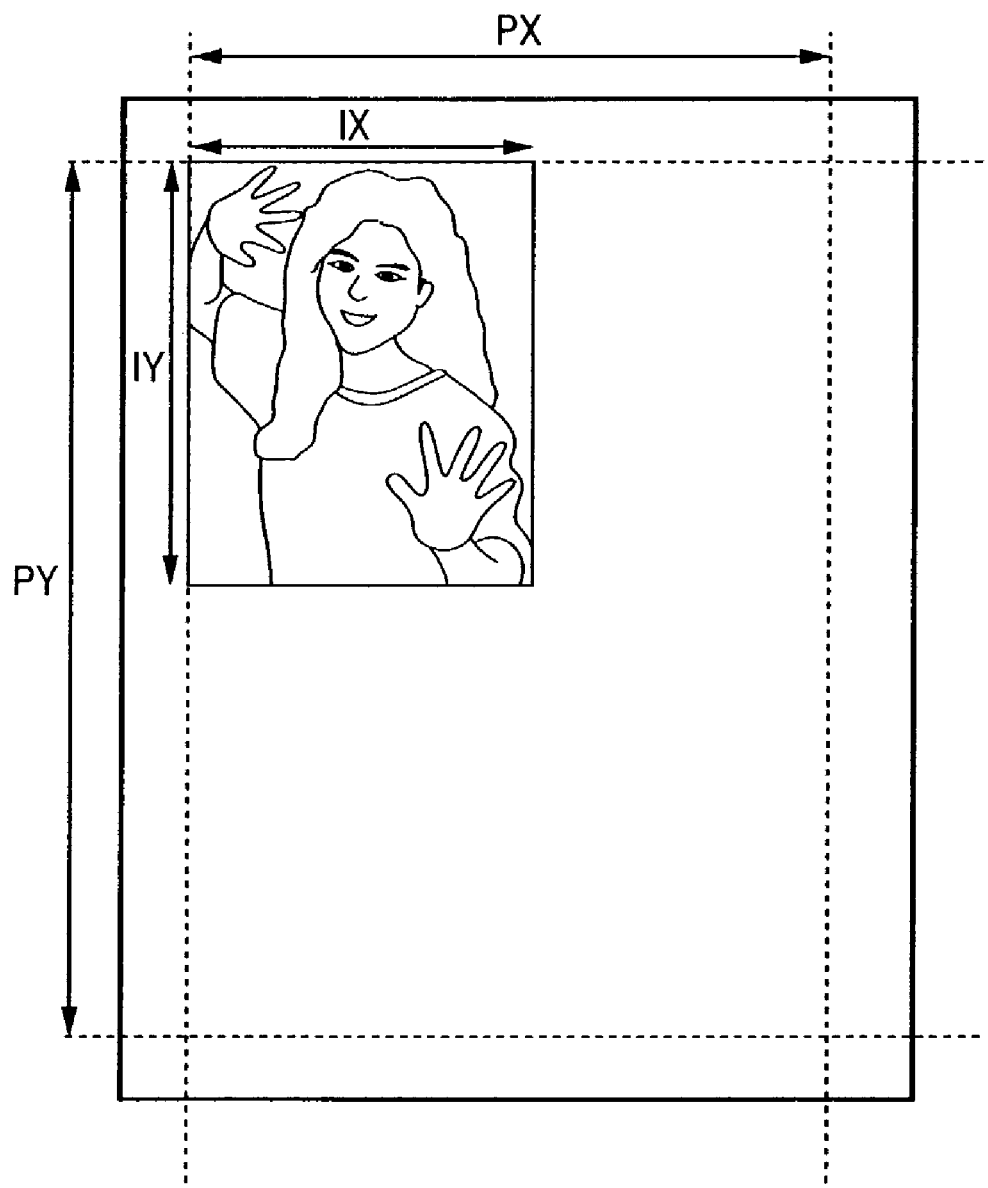
FIG. 17 shows an example of calculation of a scaleup factor when full print is performed according to the embodiment of the present invention.
Figure 18:
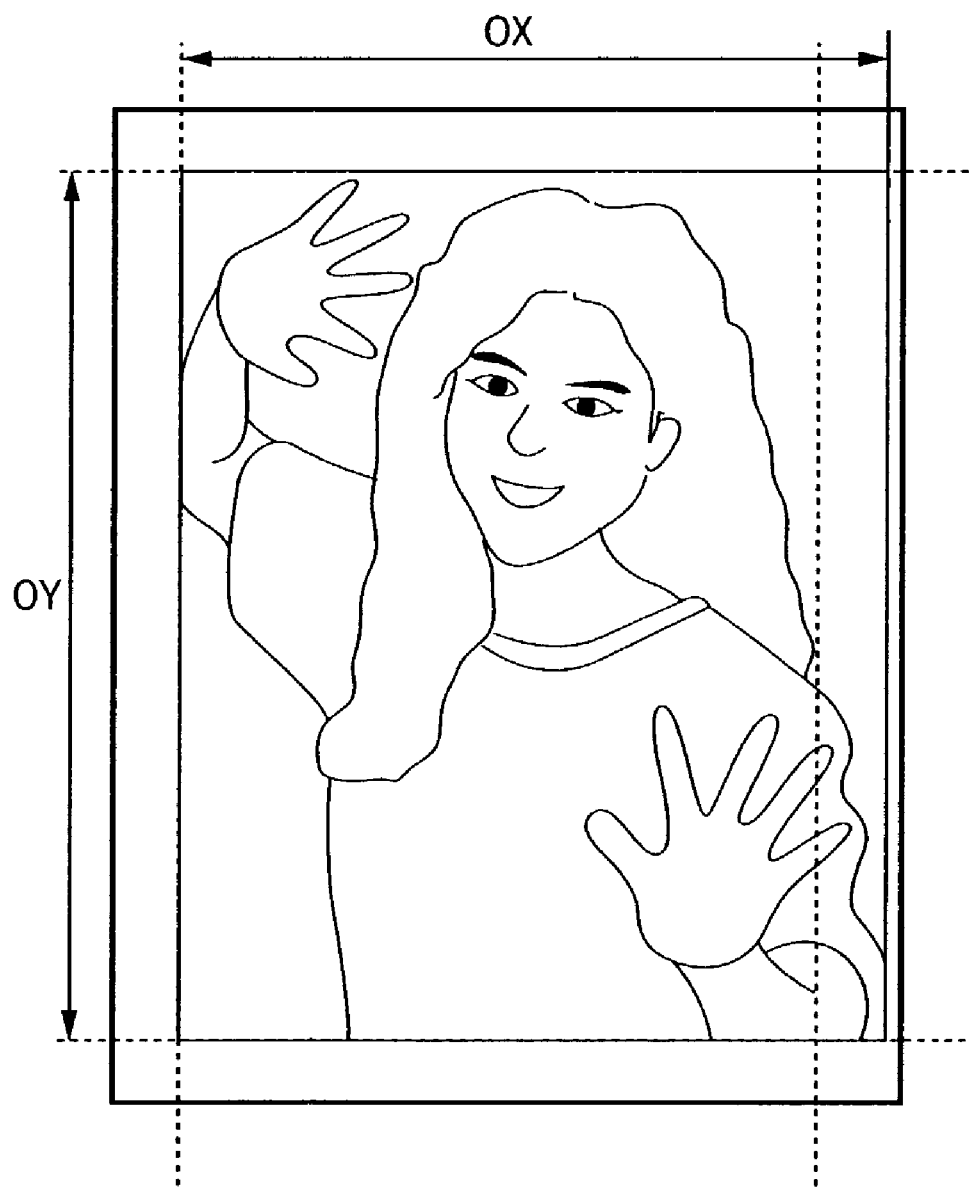
FIG. 18 shows an image laterally extending off the print area when full print is performed according to the embodiment of the present invention.

In FIG. 17, reference symbol PX denotes the lateral length of the print area, reference symbol PY denotes the longitudinal length of the print area, reference symbol IX denotes the lateral length of the print image, and reference symbol IY denotes the longitudinal length of the print image. Here, since equation (1) holds when the following aspect ratios are calculated, $$IY/IX < PY/PX \qquad \text{equation (1)}$$

a scaleup factor allowing no margin to be left in the print area is the ratio between longitudinal lengths (PY/IY), and the ratio is stored in the storage area 421$d$ for scaling factors of the RAM 42. In this case, the sizes (lateral: OX, longitudinal: OY) of the image scaled up (see FIG. 18) are expressed by the following equations (2) and (3).

$$OX = IX \times (PY/IY) \qquad \text{equation (2)}$$

$$OY = PY \qquad \text{equation (3)}$$

Figure 19:
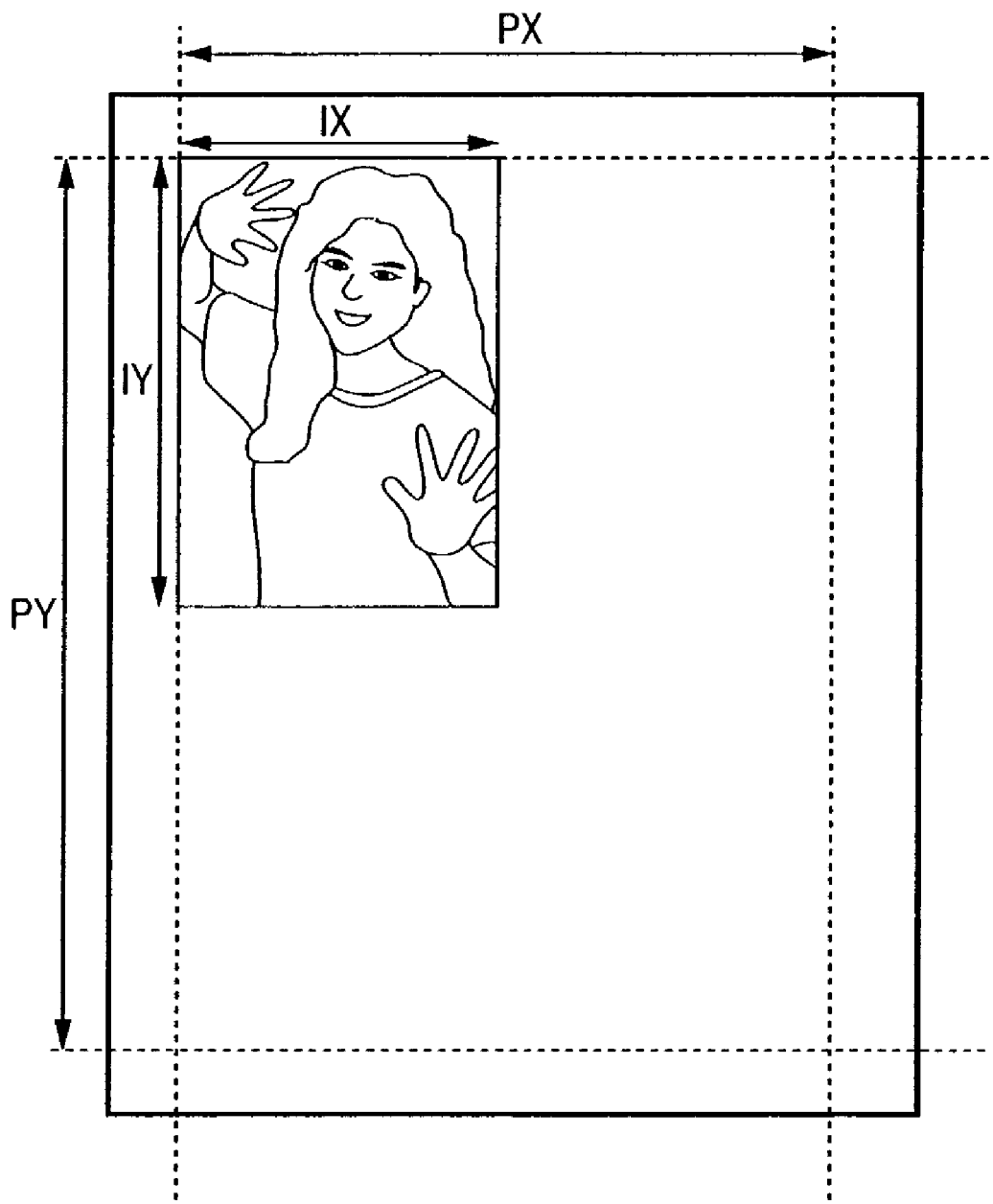
FIG. 19 shows another example of calculation of a scaleup factor when full print is performed according to the embodiment of the present invention.
Figure 20:
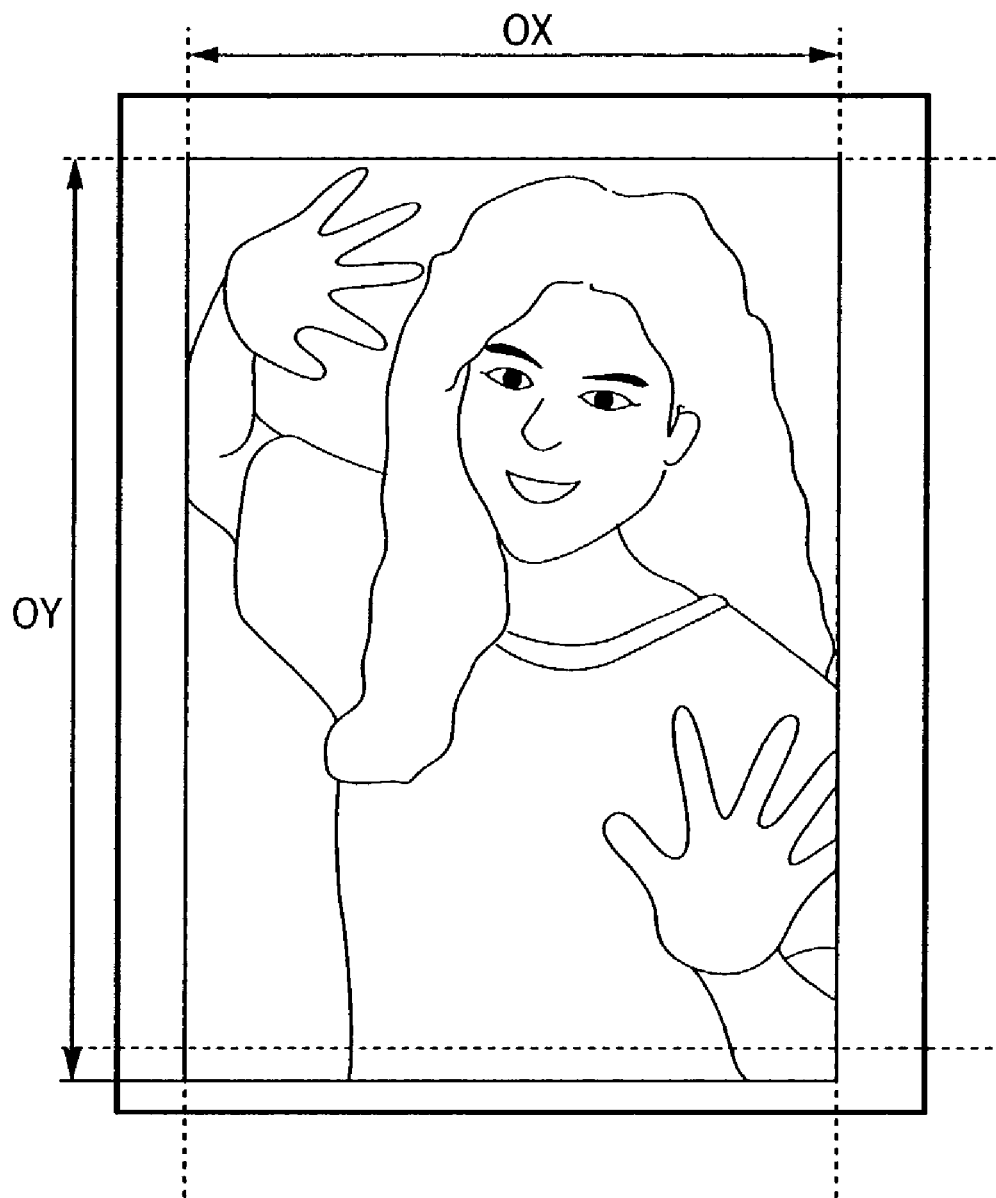
FIG. 20 shows an image longitudinally extending off the print area when full print is performed according to the embodiment of the present invention.

Conversely, since the following equation (4) is given when aspect ratios are calculated in FIG. 19, $$IY/IX >= PY/PX \qquad \text{equation (4)}$$

a scaleup factor allowing no margin to be left in the print area is the ratio between lateral lengths (PX/IX). That is, the sizes (lateral: OX, longitudinal: OY) of the image scaled up (see FIG. 20) are expressed by the following equations (5) and (6).

$$OX = PX \qquad \text{equation (5)}$$

$$OY = PY \times (PX/IX) \qquad \text{equation (6)}$$

Figure 21:
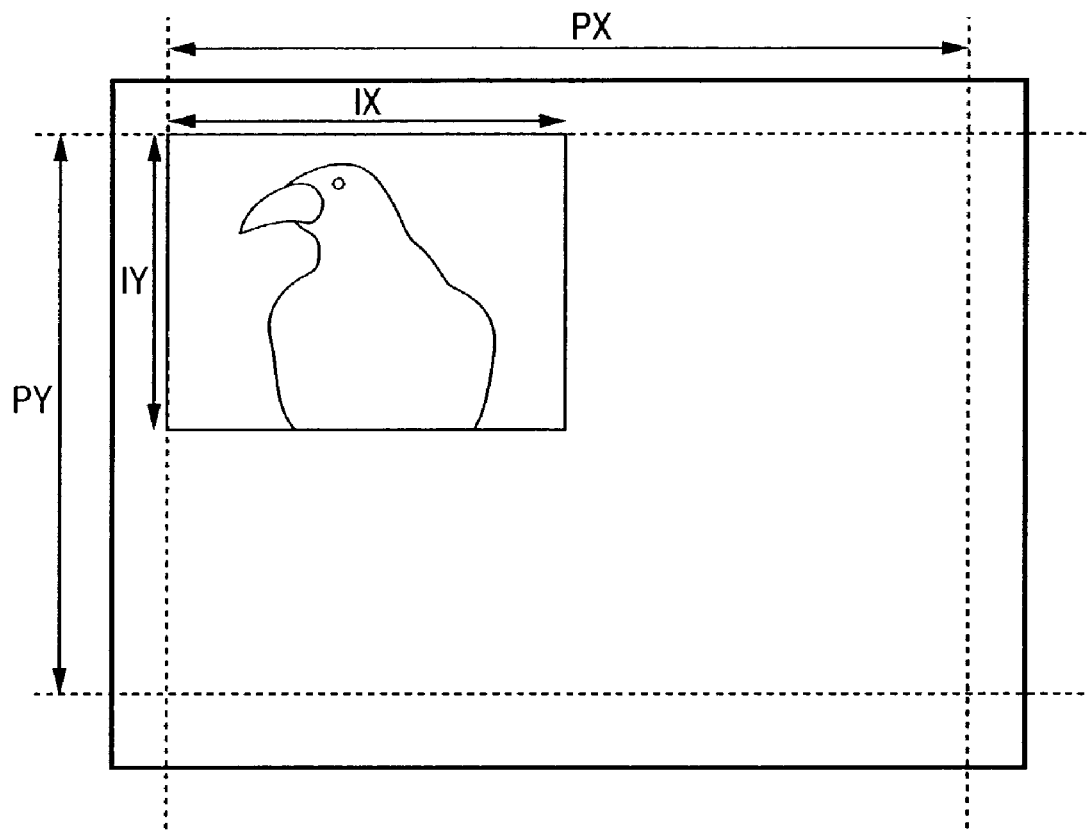
FIG. 21 is another view showing an example of calculation of a scaleup factor when full print is performed according to the embodiment of the present invention.
Figure 22:
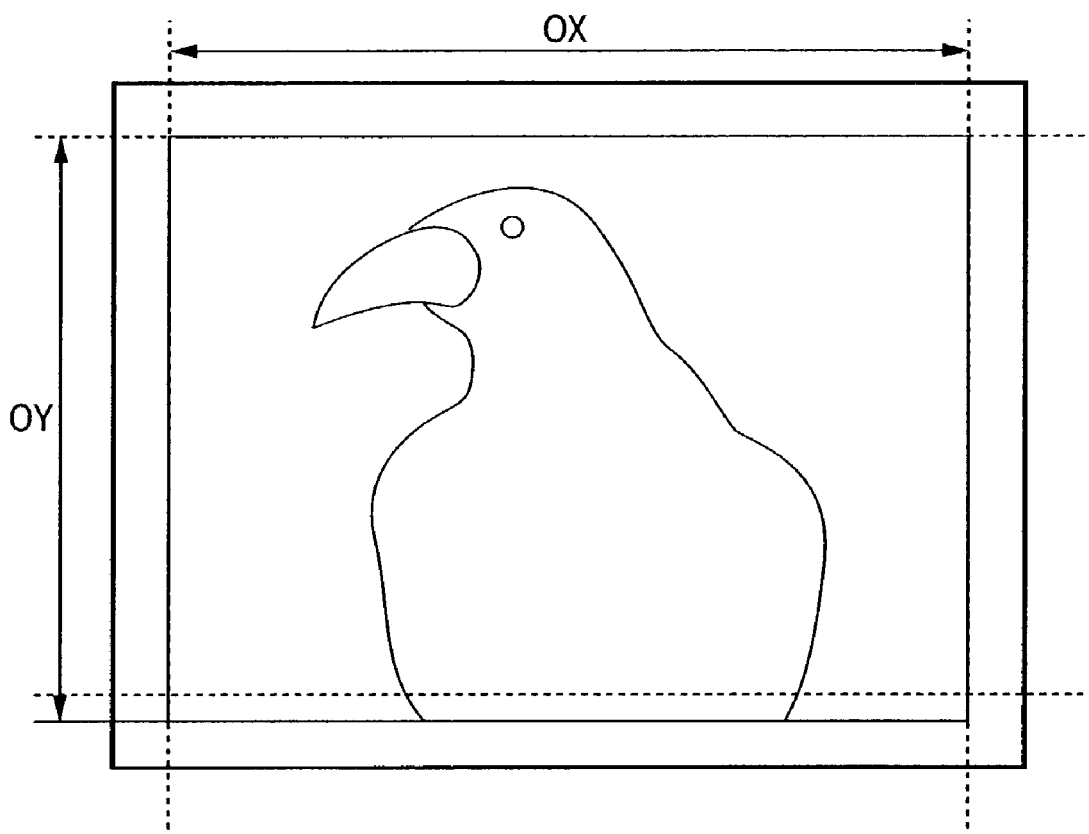
FIG. 22 shows an image longitudinally extending off the print area when full print is performed according to the embodiment of the present invention.

Also, in the case of the print area of PX>PY, unlike the print area of PX<PY of FIGS. 17 to 20, the following equation (4) is given when aspect ratios are calculated in FIG. 21, for example, $$IY/IX >= PY/PX \qquad \text{equation (4)}$$

and therefore a scaleup factor allowing no margin to be left in the print area is the ratio between lateral lengths (PX/IX). That is, the sizes (lateral: OX, longitudinal: OY) of the image scaled up (see FIG. 22) are expressed by the following equations (5) and (6).

$$OX = PX \qquad \text{equation (5)}$$

$$OY = PY \times (PX/IX) \qquad \text{equation (6)}$$

Furthermore, in the case where the image is scaled down, inequalities (1) and (4) may be used with the aspect ratios being reversed, or signs of inequalities (1) and (4) may be inverted after aspect ratios are similarly calculated. In image scaledown processing, thinning or scaling processing is carried out.

Figure 6:
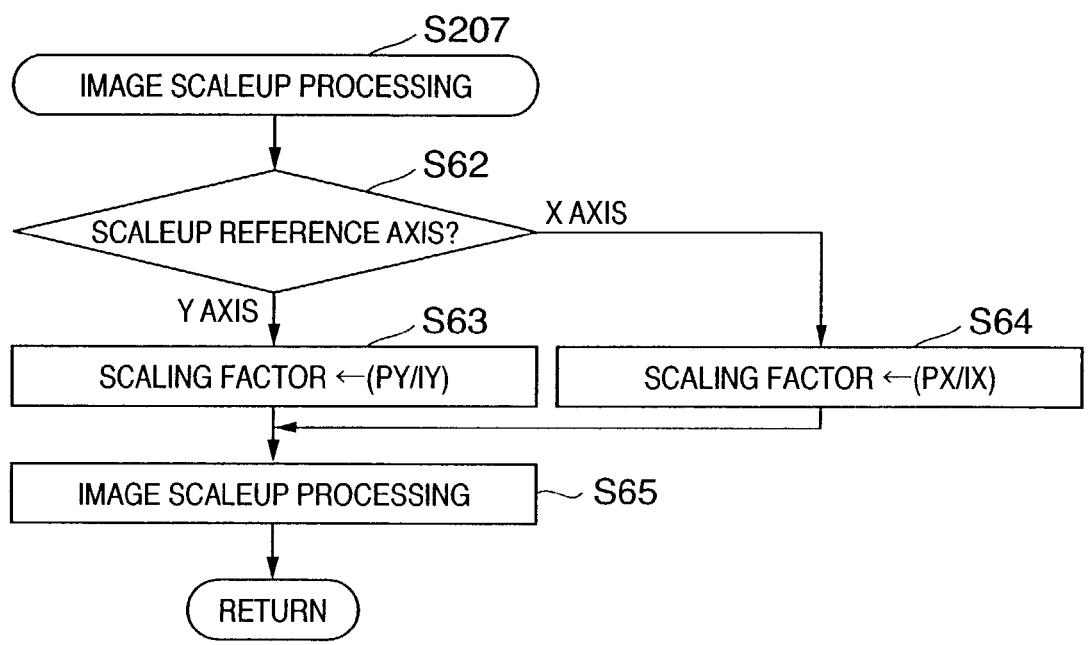
FIG. 6 is a flowchart showing an example of procedure of image scaleup processing S207 of FIG. 5.

FIG. 6 is a flowchart showing an example of procedure of image scaleup processing in step S207 of FIG. 5 in this example. Furthermore, processing in step S61 is skipped here.

First, whether the scaleup reference axis is the X or Y axis is determined at step S62. That is, whether equation (1) is satisfied or equation (4) is satisfied is determined. If equation (1) is satisfied, processing proceeds to step S63, where the scaling factor is calculated from (PY/IY) with the Y axis as a reference axis and stored in the storage area 421$d$ for scaling factors of the RAM 42. If equation (4) is satisfied, on the other hand, processing proceeds to step S64, where the scaling factor is calculated from (PX/IX) with the X axis as a reference axis and stored in the storage area 421$d$ for scaling factors of the RAM 42.

At step 65, based on the scaling factor stored in the storage area 421$d$ for scaling factors, the image is scaled up according to equations (2) and (3) and stored in the RAM 42 on a temporary basis if processing proceeds from step S63. If processing proceeds from step S64, the image is scaled up according to equations (5) and (6) and stored in the RAM 42 on a temporary basis.

Another Example of Procedure of Print Data Creation Processing S42

An example in which the area of portion of the image to be cut off is minimized in borderless print will be described here with reference to FIGS. 11 to 16.

Figure 11:
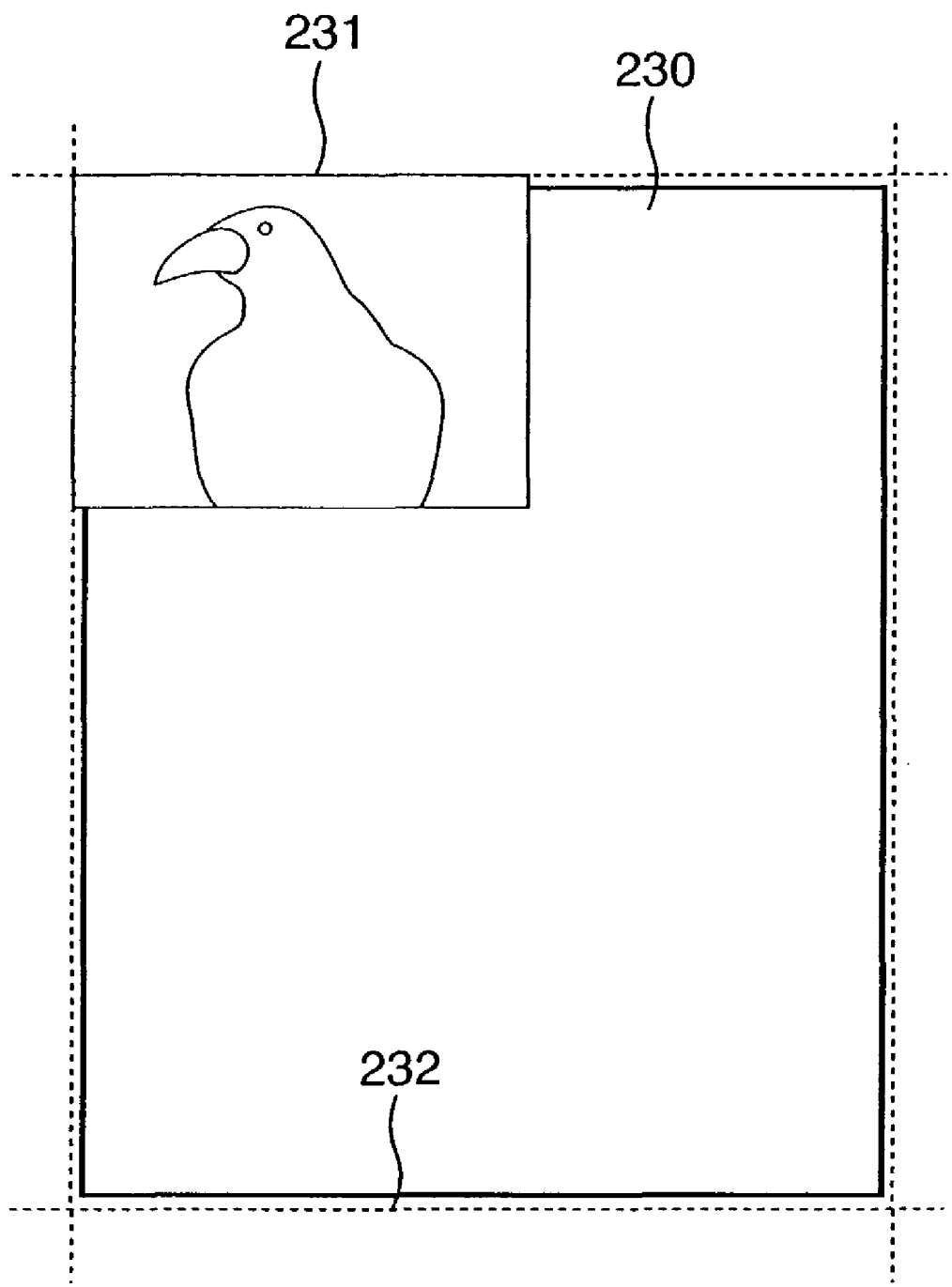
FIG. 11 shows another example of image layout before performing a full print function and a centering function according to the embodiment of the present invention.
Figure 12:
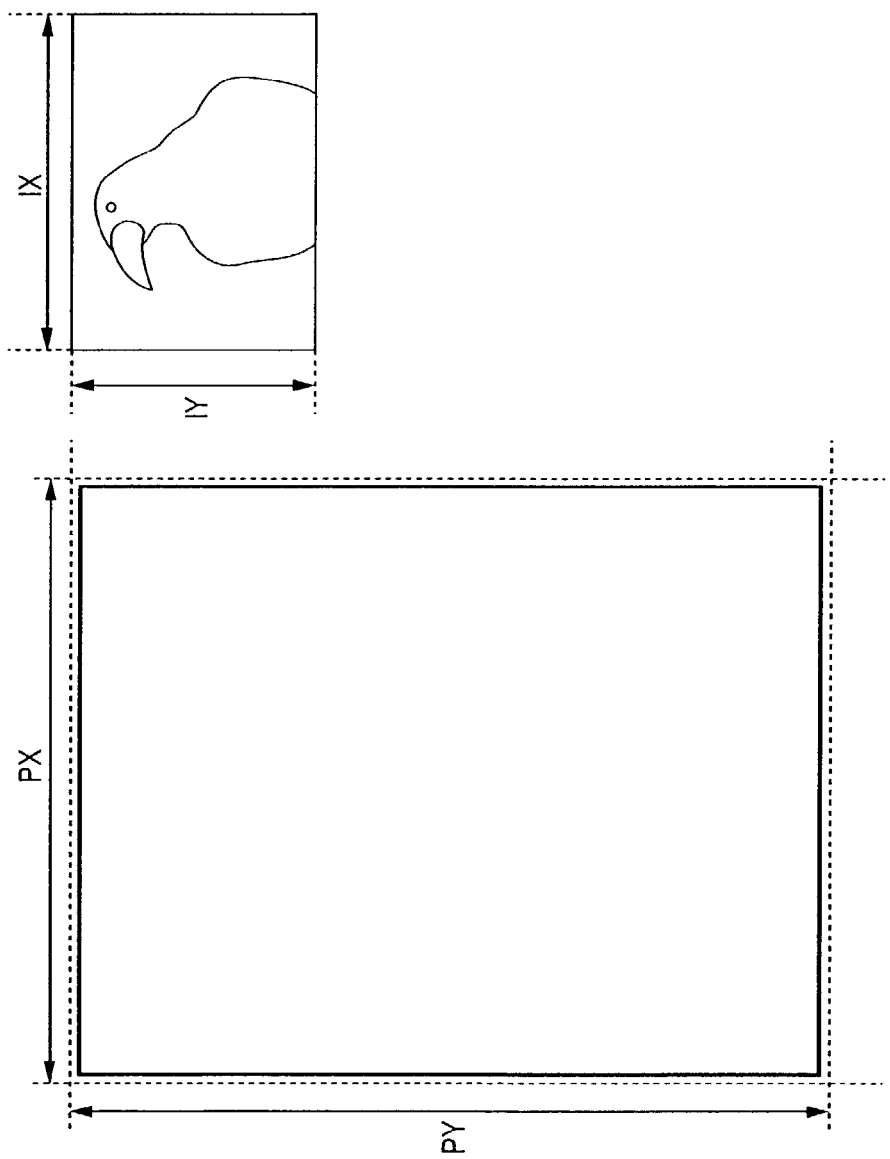
FIG. 12 illustrates an aspect ratio according to the embodiment of the present invention in FIG. 11.

First, prior to the above example of procedure, processing for minimizing the area of portion of the image to be cut off is carried out at step S205. The relation between the print medium (medium 230 of FIG. 11) and the print image (denoted by reference numeral 231 in FIG. 11) and the print area (denoted by reference numeral 232 in FIG. 11) is shown in FIG. 11. Here, the aspect ratio (PY/PX) of the print area and the aspect ratio (IY/IX) of the image are calculated (see FIG. 12).

$$IY/IX < 1.0 \text{ and } PY/PX < 1.0 \qquad \text{equation (7)}$$

$$\text{or } IY/IX >= 1.0 \text{ and } PY/PX >= 1.0 \qquad \text{equation (8)}$$

If the above inequalities (7) and (8) hold, it means that the area of portion of the image to be cut off is small and hence the image does not need to be rotated, and therefore processing may be continued with the direction of the image kept unchanged, at branched step S205-1. If at least one of the above inequalities (7) and (8) does not hold, however, the area of portion of the image to be cut off can be reduced by rotating the image to an angle of 90° as shown in FIG. 13, and therefore the image is rotated to an angle of 90° (in the right direction in the example of FIG. 13) at step S205-2, followed by storing the rotated image data in the RAM 42 and then proceeding to next processing.

Figure 13:
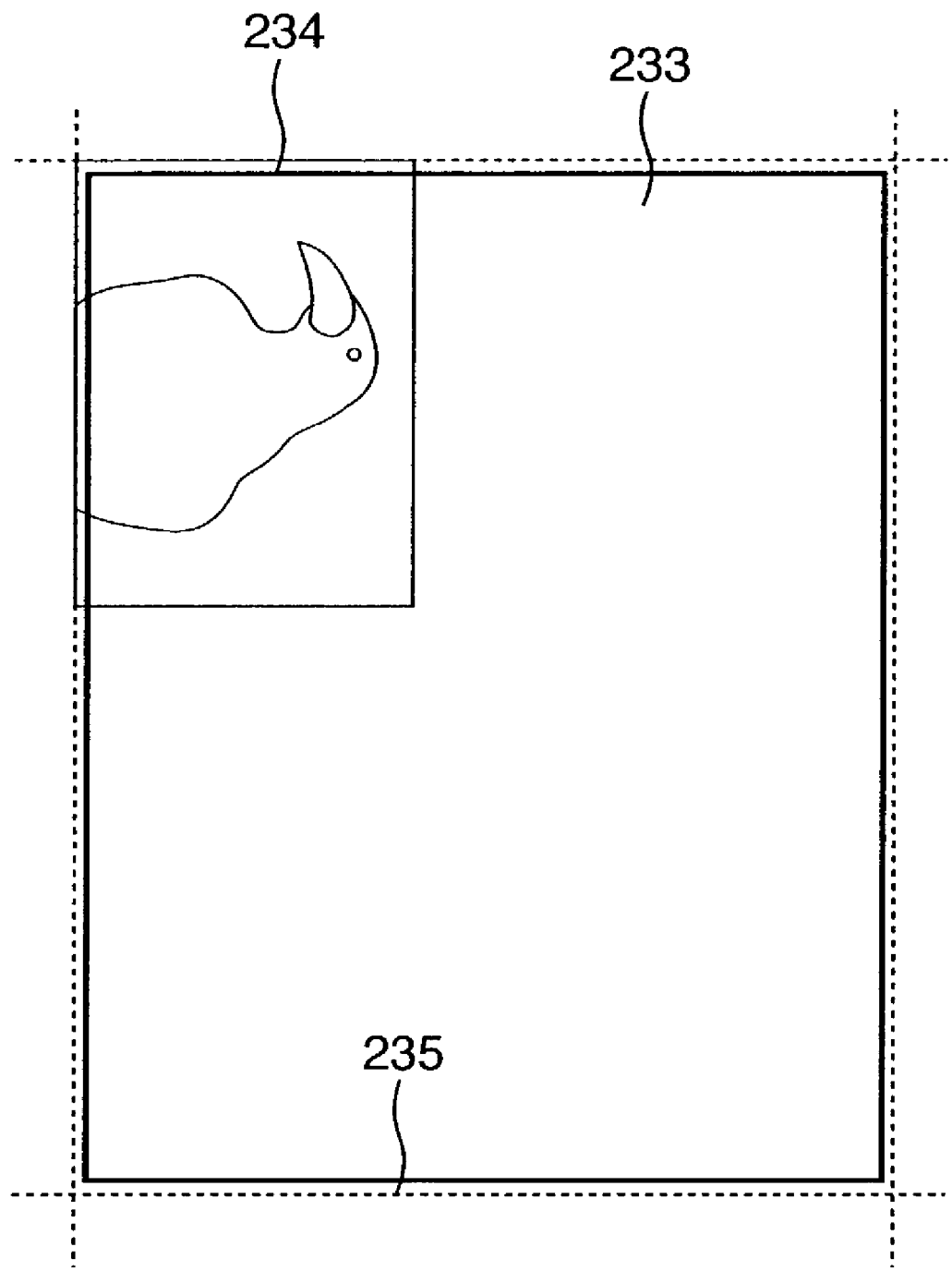
FIG. 13 shows an image rotated to an angle of 90° in the right direction according to the embodiment of the present invention in FIG. 11.
Figure 14:
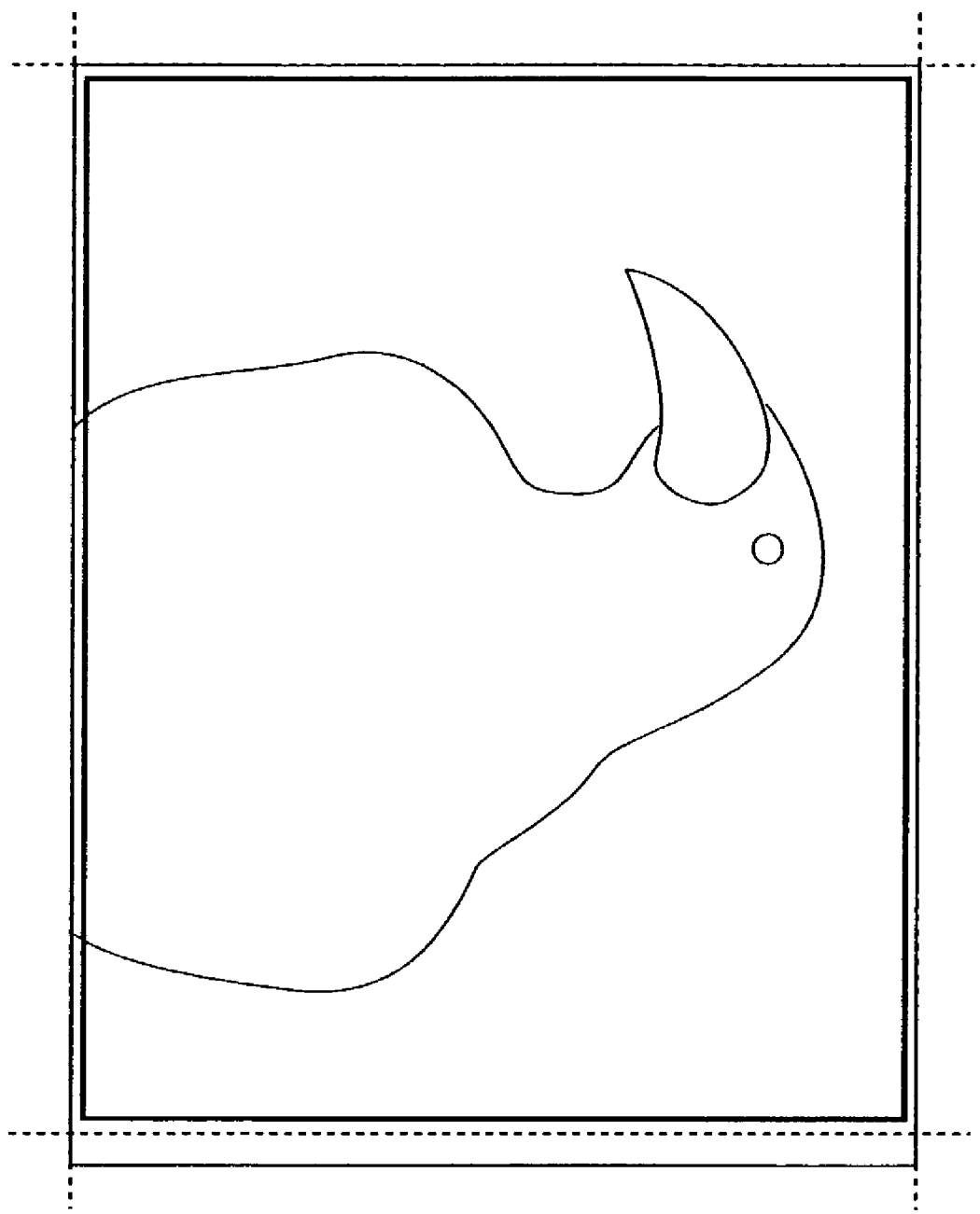
FIG. 14 shows an example of an image obtained by performing on the image of FIG. 13 the full print function according to the embodiment of the present invention.

The relation between the print medium (medium 233 of FIG. 13) and the image (denoted by reference numeral 234 in FIG. 13) and the print area (denoted by reference numeral 235 in FIG. 13) is shown in FIG. 13. Whether the full print function is ON or not is determined at step S206 in FIG. 5, and if it is ON, then the image is scaled up so that a margin is not left in the print area with the aspect ratio kept unchanged, and the image scaled up is stored in the RAM 42 on a temporary basis, at step S207 (see FIG. 14). Scaleup processing is not carried out if the full print function is OFF. Here, a scaleup factor allowing the image to extend over the entire print area in longitudinal length is acceptable, but a scaleup factor such that the image extends over the entire print area in lateral length may be achieved depending on the image and print area. The case classification for this is same as that described above.

Figure 15:
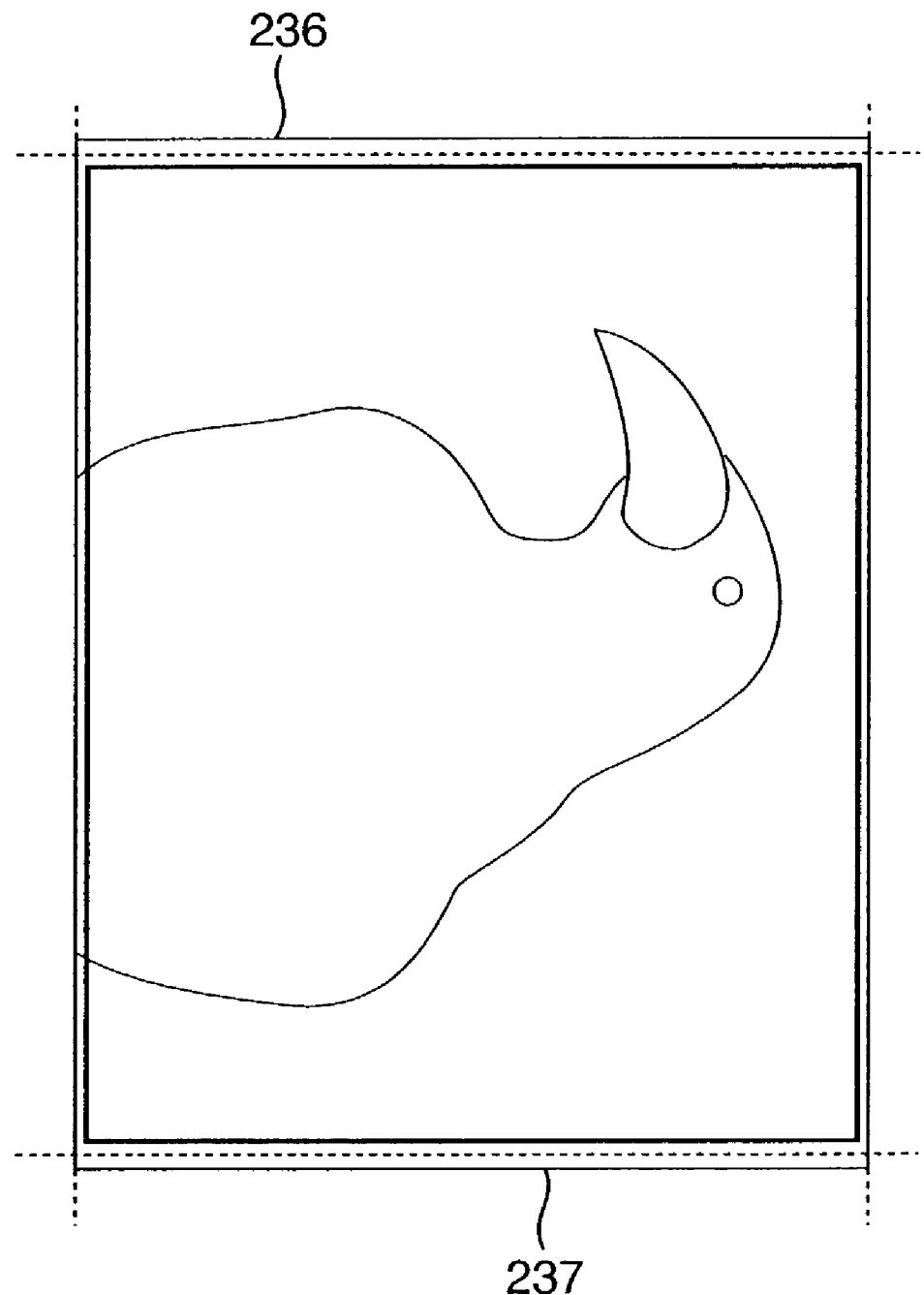
FIG. 15 shows an example of an image obtained by performing on the image of FIG. 14 the centering function according to the embodiment of the present invention.
Figure 16:
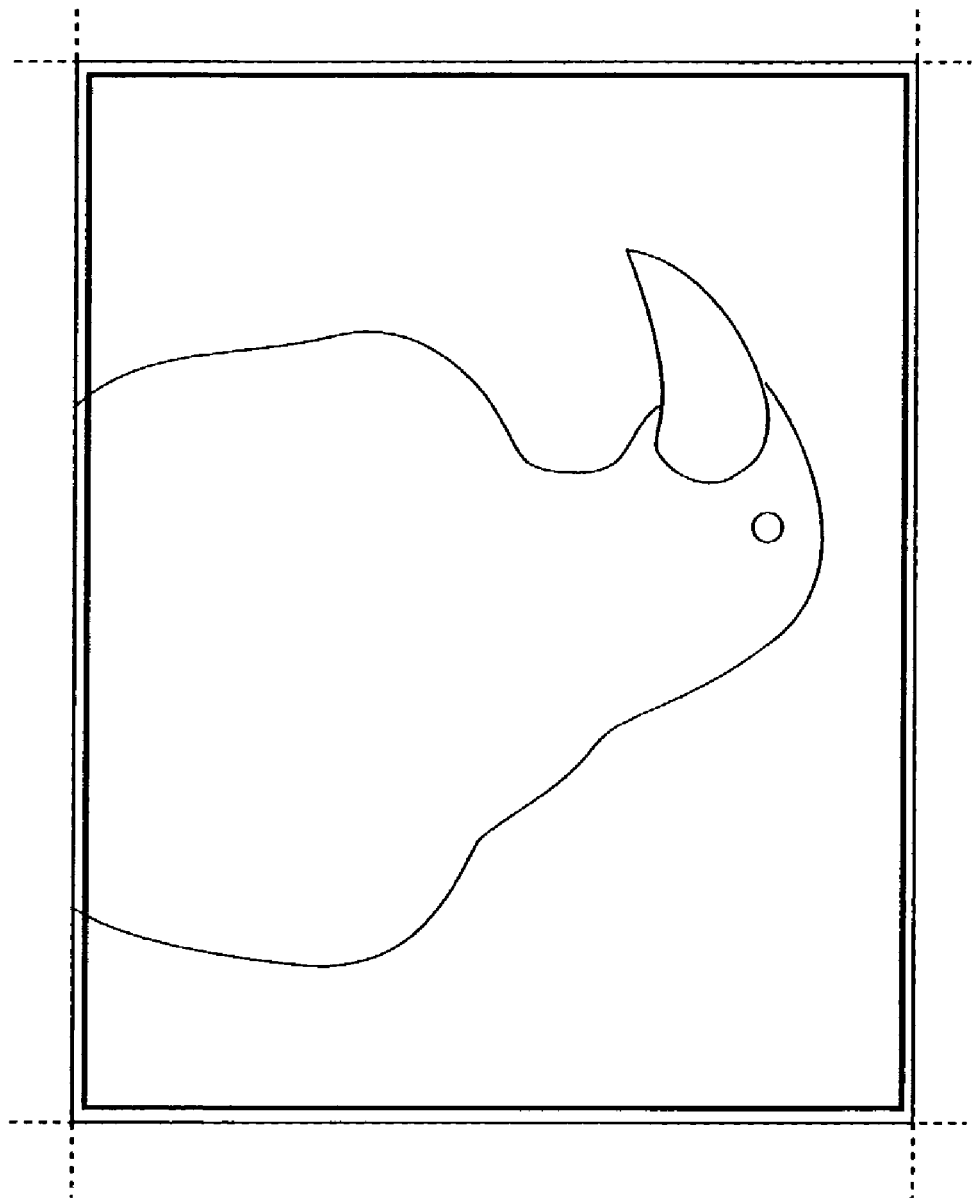
FIG. 16 shows an example of an image obtained by cutting off the portion of the image of FIG. 15 extending off a print area according to the embodiment of the present invention.

Then, whether centering is ON or not is determined at step S208, and if it is ON, the centering of the image is carried out and the image is stored in the RAM 42 on a temporary basis at step S209 (see FIG. 15). The centering of the image is not carried out if centering is OFF. Upper and lower portions (236 and 237) extending off the print area are deleted and the image is stored in the RAM 42 on a temporary basis at step S210 (see FIG. 16), and this print data is sent to the printing unit.

Thus, the user turns both the full print function and centering function to ON, whereby data in the center of the image can easily be printed on the print area (print medium) in a borderless manner without leaving a margin.

Furthermore, image rotation processing is incorporated in the print data generation processing of FIG. 5 in the above embodiment, but similar processing can be carried out even if the image rotation processing is incorporated in the early stage of the procedure of image scaleup processing of FIG. 6. In this case, whether the image is rotated or not is determined and processing is carried out only if full print is ON.

Also, the present invention may be applied to a system constituted by a plurality of devices (e.g. host computer, interface device, reader, printer, etc.), or may be applied to an apparatus constituted by one device having a plurality of functions.

Also, as described above, the object of the present invention is achieved by supplying to a system or apparatus a storage medium (recording medium) in which a program code of software for performing the functions of the aforesaid embodiment is recorded, and causing a computer of the system or apparatus (or CPU or MPU) to read and execute the program code stored in the storage medium as a matter of course. In this case, the program code itself read from the storage medium performs the functions of the aforesaid embodiment, and the storage medium storing the program code constitutes the present invention. Also, needless to say, the present invention includes not only the case where the functions of the aforesaid embodiment are performed by executing the program code read by the computer, but also the case where an operation system (OS) or the like operating on the computer carries out part or all of actual processing based on the instruction of the program code, whereby the functions of the aforesaid embodiment are performed.

Furthermore, needless to say, the present invention includes the case where the program code read from the storage medium is written in a memory provided in a feature expansion card inserted in the computer or a feature expansion unit connected to the computer, and thereafter the CPU or the like provided in the feature expansion card or the feature expansion unit carries out part or all of actual processing based on the instruction of the program code, whereby the functions of the aforesaid embodiment are performed.

In the case where the present invention is applied to the above storage medium, program codes including the program codes corresponding to the flowcharts described previously are stored in the storage medium.

As described above, according to the present invention, an image processing method for performing output processing such that a simple operation by the user causes the output area to be filled, and an apparatus and a printer driver for carrying out the method can be provided.

That is, the user can easily print an image on the print area without leaving a margin by combining the full print function with the centering function. Also, a dedicated application is not necessary as long as the printer driver of the present invention is available. In particular, the present invention is still further effective in the image processing apparatus for borderless print.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for generating print data to be transmitted to a print device, comprising:
a scaling unit constructed to scale an image on a print area larger than a print medium in a same scaling factor in both longitudinal and lateral directions, if a full print function is designated;
a shift unit constructed to shift, when a centering of the scaled image is designated, a position of the scaled image to a position of the scaled image to a position in which extension lengths at both sides of the scaled image extending off the print area are the same so that a center of the scaled image coincides with a center of the print area; and
a cut off unit constructed to cut off a portion of the scaled and shifted image extending off the print area when the scaled and shifted image extends off the print area,
wherein if IY/IX<PY/PX is positive (PX is a lateral length of the print area, PY is a longitudinal length of the print area, IX is a lateral length of the print image, and IY is a longitudinal length of the print image), the scaling unit scales the image on the print area larger than the print medium in the same scaling factor PY/IY in both longitudinal and lateral directions, and
wherein if IY/IX>=PY/PX is positive, the scaling unit scales the image on the print area larger than the print medium in the same scaling factor PX/IX in both longitudinal and lateral directions.

2. The apparatus according to claim 1, further comprising a reception unit constructed to receive a print instruction inputted from an application.

3. The apparatus according to claim 1, further comprising an output unit constructed to output print data representing the scaled, shifted and cut off image to the print device.

4. The apparatus according to claim 1, further comprising a rotation unit constructed to calculate an aspect ratio of the print area and an aspect ratio of the image, and to rotate the image in an angle of 90 degree when any of two condition are not satisfied while not to rotate the image when both two conditions are satisfied, wherein a first condition is that the calculated aspect ratios of the print area and the image are less than 1.0 and a second condition is that the calculated aspect ratios of the print area and the image are not less than 1.0.

5. A method of generating print data to be transmitted to a print device, comprising:
a scaling step of scaling an image on a print area larger than a print medium in a same scaling factor in both longitudinal and lateral directions, if a full print function is designated;
a shift step of shifting, when a centering of the scaled image is designated, a position of the scaled image to a position in which extension lengths at both sides of the scaled image extending off the print area are the same so that a center of the scaled image coincides with a center of the print area; and
a cut off step of cutting off a portion of the scaled and shifted image extending off the print area when the scaled and shifted image extends off the print area, wherein if IY/IX<PY/PX is positive (PX is a lateral length of the print area, PY is a longitudinal length of the print area, IX is a lateral length of the print image, and IY is a longitudinal length of the print image), the scaling step scales the image on the print area larger than the print medium in the same scaling factor PY/IY in both longitudinal and lateral directions, and wherein if IY/IX>=PY/PX is positive, the scaling step scales the image on the print area larger than the print medium in the same scaling factor PX/IX in both longitudinal and lateral directions.

6. A non-transitory computer-readable storage medium which stores a computer-executable program of generating print data to be transmitted to a print device, said program comprising:

a scaling step of scaling an image on a print area larger than a print medium in a same scaling factor in both longitudinal and lateral directions, if a full print function is designated;

a shift step of shifting, when a centering of the scaled image is designated, a position of the scaled image to a position in which extension lengths at both sides of the scaled image extending off the print area are the same so that a center of the scaled image coincides with a center of the print area; and a cut off step of cutting off a portion of the scaled and shifted image extending off the print area when the scaled and shifted image extends off the print area, wherein if IY/IX<PY/PX is positive (PX is a lateral length of the print area, PY is a longitudinal length of the print area, IX is a lateral length of the print image, and IY is a longitudinal length of the print image), the scaling step scales the image on the print area larger than the print medium in the same scaling factor PY/IY in both longitudinal and lateral directions, and wherein if IY/IX>=PY/PX is positive, the scaling step scales the image on the print area larger than the print medium in the same scaling factor PX/IX in both longitudinal and lateral directions.

* * * * *